(12) United States Patent
Vermeyden et al.

(10) Patent No.: US 11,329,738 B2
(45) Date of Patent: *May 10, 2022

(54) DEVICE, SYSTEM AND METHOD FOR REAL-TIME PERSONALIZATION OF STREAMING VIDEO

(71) Applicant: BUILDSCALE, INC., Kitchener (CA)

(72) Inventors: Pieter Willem Vermeyden, Kitchener (CA); Stephen Claude Wright, Kitchener (CA); Devon Bruce Galloway, Kitchener (CA); Tyler James Campaigne, Kitchener (CA)

(73) Assignee: BUILDSCALE, INC., Kitchener (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/916,291

(22) Filed: Jun. 30, 2020

(65) Prior Publication Data
US 2020/0336231 A1    Oct. 22, 2020

Related U.S. Application Data

(63) Continuation of application No. 15/933,915, filed on Mar. 23, 2018, now Pat. No. 10,742,337.

(51) Int. Cl.
*H04N 7/10* (2006.01)
*H04H 20/10* (2008.01)
(Continued)

(52) U.S. Cl.
CPC ......... *H04H 20/106* (2013.01); *G06F 16/735* (2019.01); *H04N 21/4586* (2013.01)

(58) Field of Classification Search
CPC .............. H04H 20/106; G06F 16/735; H04N 21/4586; H04N 21/4825; H04N 21/4316; H04N 21/44016; H04N 21/8456
See application file for complete search history.

(56) References Cited

U.S. PATENT DOCUMENTS

2011/0311199 A1* 12/2011 Fay ................... G06F 3/048
                                                    386/241
2011/0320287 A1* 12/2011 Holt ................ H04N 21/235
                                                    705/14.73

(Continued)

OTHER PUBLICATIONS

Vermeyden, Pieter Willem, et al., "Device, System and Method for Real-Time Personalization of Streaming Video", U.S. Appl. No. 15/933,915, filed Mar. 23, 2018.

*Primary Examiner* — Annan Q Shang
(74) *Attorney, Agent, or Firm* — Perry + Currier, Inc.

(57) ABSTRACT

A device, system and method for real-time personalization of streaming video is provided. The device has access to a memory storing: nonpersonalized video segments; and data for rendering personalized video segments, the nonpersonalized video segments and the personalized video segments associated with a given order. When a request for a personalized video is received, the device causes rendering of at least a subset of the personalized video segments to be rendered using the data, incorporating personal data associated with the request into the personalized video segments. As the personalized video segments are rendered, the device updates and transmits a manifest, to the communication device, identifying available video segments according to the given order. The video segments identified in the manifest are provided to the communication device in response to receiving requests for the video segments.

20 Claims, 13 Drawing Sheets

(51) Int. Cl.
 *H04N 21/458* (2011.01)
 *G06F 16/735* (2019.01)

(56) References Cited

U.S. PATENT DOCUMENTS

| | | | |
|---|---|---|---|
| 2012/0072286 A1* | 3/2012 | Kilar | G06Q 30/02 |
| | | | 705/14.55 |
| 2012/0079537 A1* | 3/2012 | Kalidindi | H04N 21/84 |
| | | | 725/40 |
| 2013/0195429 A1* | 8/2013 | Fay | G11B 27/034 |
| | | | 386/278 |
| 2013/0272679 A1* | 10/2013 | Cavalcanti | H04N 9/87 |
| | | | 386/282 |
| 2015/0156159 A1* | 6/2015 | Hanson | G06Q 30/0267 |
| | | | 709/204 |
| 2015/0161565 A1* | 6/2015 | Kraft | G06F 40/143 |
| | | | 348/441 |
| 2016/0044358 A1* | 2/2016 | Zucchetta | H04N 21/26258 |
| | | | 725/32 |
| 2017/0277863 A1* | 9/2017 | Subra | G09B 19/0092 |
| 2017/0332113 A1* | 11/2017 | Haritaoglu | H04N 21/8456 |
| 2018/0376177 A1* | 12/2018 | Nugent | H04L 67/02 |

* cited by examiner

_US 11,329,738 B2_

DEVICE, SYSTEM AND METHOD FOR REAL-TIME PERSONALIZATION OF STREAMING VIDEO

FIELD

The specification relates generally to streaming video, and specifically to a device, system and method for real-time personalization of streaming video.

BACKGROUND

Personalization of video is a growing field. For example, an entity, such as a company, may use a client database, and the like, to personalize a video on a client-by-client basis, for example by incorporating text of a name of a particular client from the database into at least some portions of a video, as the entire video is being rendered. The entire video, personalized for the particular client may then be stored in a memory and/or a database, and a link to the entire video may be transmitted to a device of the client (e.g. via an email, and the like) so that the entire video, which is personalized for the specific client, may be requested via the link. However, when the video is to be personalized for a plurality of names of clients, and the like, for example as part of a marketing campaign, videos are generally produced personalized for each of the plurality of names, and at least on a one-to-one basis for the plurality of names; links to each of the respective personalized videos are transmitted to each of respective devices of the clients. When the number of names of clients is in the thousands, tens of thousands, hundreds of thousands, and the like, the number of videos produced becomes commensurately very large, which uses a large amount of processing resources. Furthermore, a large amount of memory is allocated to store the videos, which may need to be stored for a lengthy period in the event, for example, a client doesn't request the video for days, months and/or years and/or in the event a client requests the video more than once; hence, memory for storing thousands, tens of thousands, hundreds of thousands, and the like, of personalized videos may need to be allocated for a lengthy period, whether the personalized videos are requested or not. Indeed, in some instances, more than one video in different formats may be produced for each of the plurality of names, for example with different resolutions, different frame rates, different video types (e.g. MPEG2TS vs MP4 file types, and/or other file types) and the like, which again increases use of processing and memory resources.

BRIEF DESCRIPTIONS OF THE DRAWINGS

For a better understanding of the various embodiments described herein and to show more clearly how they may be carried into effect, reference will now be made, by way of example only, to the accompanying drawings in which.

DETAILED DESCRIPTION

An aspect of the specification provides a device comprising: a communication interface; and a controller having access to a memory storing: nonpersonalized video segments; and data for rendering personalized video segments, the nonpersonalized video segments and the personalized video segments associated with a given order, the controller configured to: receive, from a communication device, using the communication interface, a request for a personalized video; cause rendering of at least a subset of the personalized video segments using the data for rendering the personalized video segments and incorporating personal data associated with the request; generate, and transmit to the communication device, using the communication interface, a manifest identifying at least a first video segment selected according to the given order; update, and transmit to the communication device, using the communication interface, the manifest to identify, according to the given order, further available video segments, as rendering of each of the personalized video segments is completed; and provide to the communication device, using the communication interface, as the personalized video, video segments identified in the manifest, in response to receiving requests for the video segments from the communication device.

Another aspect of the specification provides a method comprising: receiving, at a device, from a communication device, using a communication interface, a request for a personalized video, the device having access to a memory storing: nonpersonalized video segments; and data for rendering personalized video segments, the nonpersonalized video segments and the personalized video segments associated with a given order; causing rendering of at least a subset of the personalized video segments using the data for rendering the personalized video segments and incorporating personal data associated with the request; generating, and transmitting to the communication device, using the communication interface, a manifest identifying at least a first video segment selected according to the given order; updating, and transmitting to the communication device, using the communication interface, the manifest to identify, according to the given order, further available video segments, as rendering of each of the personalized video segments is completed; and providing to the communication device, using the communication interface, as the personalized video, video segments identified in the manifest, in response to receiving requests for the video segments from the communication device.

Figure 1:
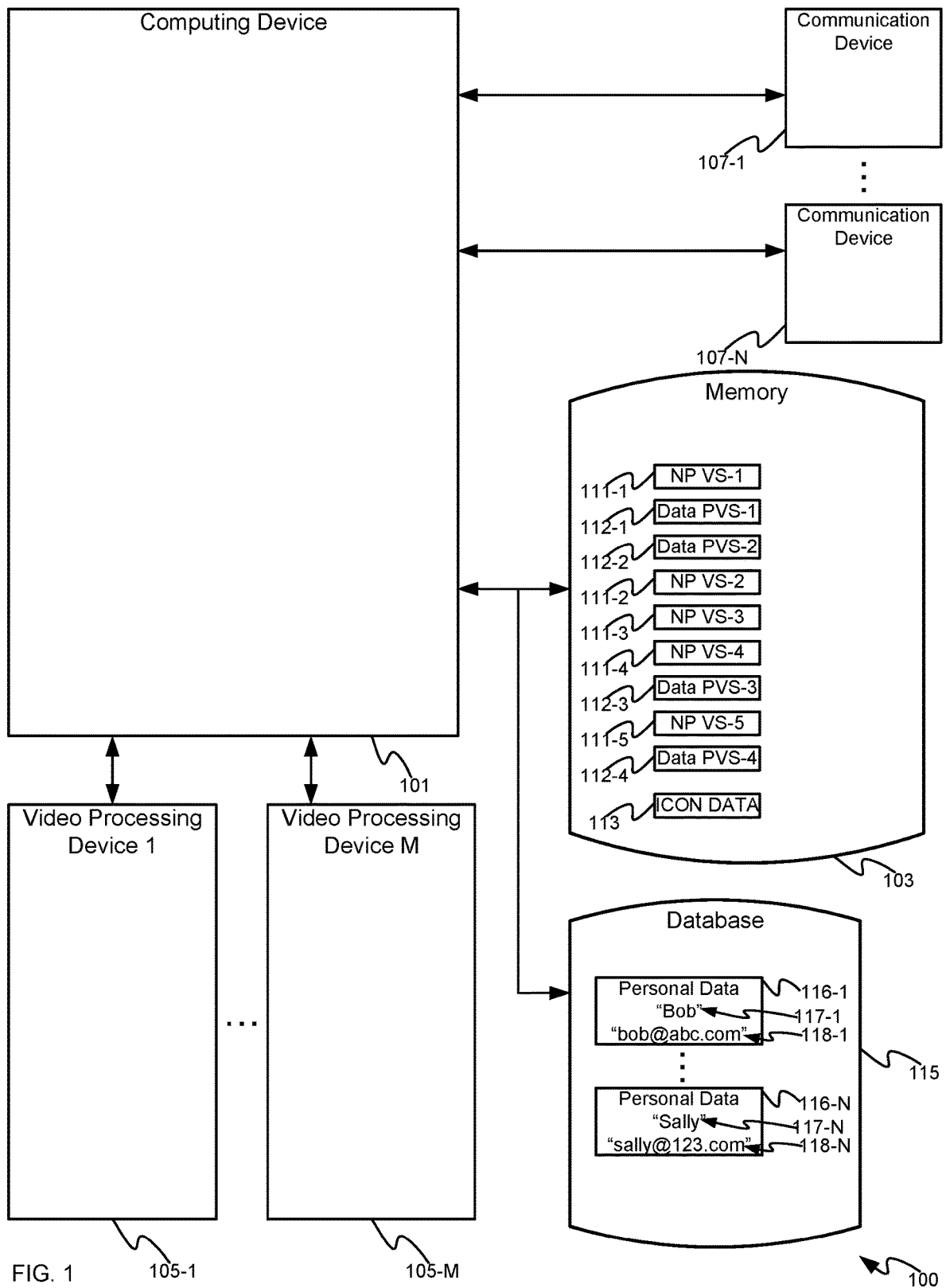
FIG. 1 depicts a system for real-time personalization of streaming video, in accordance with some embodiments.

Attention is directed to FIG. 1 which depicts a system 100 for real-time personalization of streaming video. System 100 comprises a computing device 101 in communication with a memory 103, such as a database device, and the like. While the memory 103 is depicted as separate from the computing device 101, the memory 103 may be a component of the computing device 101 and/or another device of the system 100.

The computing device 101 is further in communication with a number "M" of a plurality of video processing devices 105-1 . . . 105-M, interchangeably referred to hereafter, collectively, as the video processing devices 105 and, generically, as a video processing device 105. While the video processing devices 105 are depicted as separate from the computing device 101, one or more of the video processing devices 105 may be components of the computing device 101 and/or another device of the system 100. For example, the computing device 101 may be configured to at least temporarily dedicate a portion of processing resources to implement the one or more of the video processing devices 105. Alternatively, one or more of the video processing devices 105 and/or the computing device 101 may implement functionality of the video processing devices 105 via one or more of an anonymous function, a function literal, lambda abstraction, lambda expression and/or a lambda function, and the like.

Furthermore, the number of "M" video processing devices 105 may be similar to a number of personalized video segments to be rendered for a personalized video, as described in more detail below, however the number of "M" video processing devices 105 may be less than or greater than a number of personalized video segments to be rendered for a personalized video. Either way, when the number of "M" video processing devices 105 is two or more, the number of "M" video processing devices 105 may be configured to render personalized video segments in parallel.

As depicted, the computing device 101 is in further communication with a plurality of communication devices 107-1 . . . 107-N, interchangeably referred to hereafter, collectively, as the communication devices 107 and, generically, as a communication device 107, each of which are generally configured for requesting and playing streaming video, as described in more detail below. While the computing device 101 is depicted as being in communication with all the communication devices 107, the computing device 101 may be in communication with the communication devices 107 at different points in time, for example as each of the communication devices 107 request personalized videos for a respective user associated with each of the communication devices 107. The number "N" of communication devices 107 may be as few as one communication device 107 or may be as many as tens, hundreds, thousands, hundreds of thousands, or more communication devices 107. The computing device 101 and the communication devices 107 may be in communication via respective communication connections and/or paths, and the like, represented by arrows in FIG. 1, which may include one or more wired and/or wireless communication networks, including, but not limited to, one or more of: a cellular communication network, a Bluetooth™ communication network, an NFC (near field communication) communication network, a WLAN (wireless local area network), a WiFi communication network (e.g. one or more local area communication network, a WiMax (Worldwide Interoperability for Microwave Access, operating in accordance with an IEEE 902.16 standard) communication network, a packet based communication network, the Internet, an analog communication network, the PSTN (public switched telephone network) and the like. Furthermore, each of the communication devices 107 may comprise one or more of a cell-phone, a smartphone, a personal computing device, a laptop computing device, a tablet computing device and/or any other communication device configured to communicate over a communication network to request video from the computing device 101.

The computing device 101 may comprise of a plurality of computing devices and/or servers, for example in a cloud computing arrangement and/or a cloud computing environment; any of such plurality of computing devices and/or servers may be executing functionality of the computing device 101 in a distributed fashion, sequentially or in parallel, across the one or more computing devices. Such cloud computing devices and/or servers may include, but are not limited to, the video processing devices 105. Any of such plurality of computing devices and/or servers may be geographically co-located or remotely located and inter-connected via electronic and/or optical connections and/or paths, and the like. The computing device 101 may comprise one or more web servers configured to respond to requests for content from the communication device 107, including, but not limited to, requests for a personalized video.

In general, the memory 103 stores: nonpersonalized video segments 111-1, 111-2, 111-3, 111-4, 111-5 (each labelled "NP VS", where "NP VS" represents the term "Non-Personalized Video Segment"); and data 112-1, 112-2, 112-3, 112-4 (each labelled "Data PVS", where "PVS" represents the term "Personalized Video Segment"), the data 112-1, 112-2, 112-3, 112-4 for rendering personalized video segments, as described in more detail below. The nonpersonalized video segments 111-1, 111-2, 111-3, 111-4, 111-5, will be interchangeably referred to hereafter, collectively, as the nonpersonalized video segments 111, and, generically, as a nonpersonalized video segment 111; similarly, the data 112-1, 112-2, 112-3, 112-4, will be interchangeably referred to hereafter, collectively, as the data 112 and/or, and, generically, as a set of data 112. Furthermore the nonpersonalized video segments 111 and the data 112 may be identified using a Universally Unique Identifier (UUID) a Globally Unique Identifier (GUID) and the like, which may be used to identify a specific set of nonpersonalized video segments 111 and data 112. Similarly, each of the nonpersonalized video segment 111 and each set of data 112 may be identified using respective UUIDs, GUIDs and the like.

Figure 7:
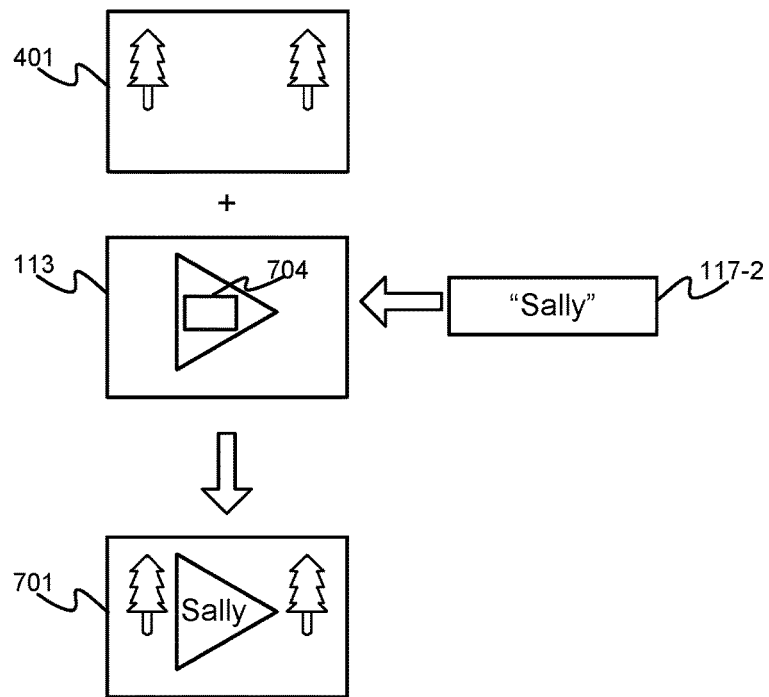
FIG. 7 depicts an example of producing a personalized icon, in accordance with some embodiments.

As depicted, the memory 103 further stores icon data 113 for rendering a personalized icon, as described in more detail below with respect to FIG. 7. The icon data 113 may specifically associated with the set of nonpersonalized video segments 111 and data 112 and/or may be generic, with a UUID, GUID, and the like, accordingly identifying the icon data 113.

The nonpersonalized video segments 111 and the personalized video segments to be rendered from the data 112 are generally associated with a given order; for example, as depicted, the nonpersonalized video segments 111 and the personalized video segments to be rendered from the data 112 are associated with a given order shown by the order of the nonpersonalized video segments 111 and the data 112. In other words, as depicted, the nonpersonalized video segment 111-1 is first in the given order, a personalized video segment to be rendered from the data 112-1 is second in the given order, etc. It is understood, however, that in FIG. 1 the personalized video segments to be rendered from the data 112 has not yet been rendered.

Together, however, the given order of the nonpersonalized video segments 111 and the personalized video segments to be rendered from the data 112 represent a personalized video that may be rendered and provided (e.g. streamed) to a communication device 107, for example by the computing device 101 upon request from a communication device 107.

While the memory 103 is depicted as storing only one set of nonpersonalized video segments 111 and data 112 for rendering personalized video segments, the memory 103 may further store a plurality of sets of associated nonpersonalized video segments and data for rendering personalized video segments to render different personalized videos. For example, a first set of associated nonpersonalized video segments and data for rendering personalized video segments may be used to render a personalized video for a holiday greeting, while a second set of associated nonpersonalized video segments and data for rendering personalized video segments may be used to render a personalized video for a sales campaign and/or a marketing campaign.

The computing device 101 may be configured to provide content to the communication devices 107 requesting such content therefrom, including, but not limited to a personalized video streamed to each communication device 107. However, the personalized video, as a whole, is generally not rendered prior to receiving a request for the personalized video.

Rather, nonpersonalized video segments 111 are generally prerendered, while personalized video segments are rendered from the data 112 upon receiving a request for the personalized video, for example using personal data associated with the request. Furthermore, a portion of the data 112 may include one or more prerendered layers that are not personalized and data for rendering a personalized layer of the personalized video. Once the nonpersonalized video segments 111 and the personalized video segments, rendered from the data 112, are provided to a communication device, the personalized video segments may be deleted and/or discarded such that only the nonpersonalized video segments 111 and the data 112 are stored long-term; in other words, personalized videos are provided "on-demand" and not prerendered. However in some embodiments, the video rendered from the nonpersonalized video segments 111 the personalized video segments are rendered from the data 112 may be stored at least temporarily and/or a given time period in the event the video is again requested such that rendering a second time is obviated.

As described in more detail below, the data 112 includes data used to render a personalized layer using personal data, that may be combined with one or more of prerendered static layers and prerendered non-static layers; the data 112 may also comprise such prerendered static layers and/or prerendered non-static layers.

Such personal data used to render a personalized layer may be stored in a database 115, for example as personal data 116-1 . . . 116-N, interchangeably referred to hereafter, collectively, as the personal data 116 and, generically, as a set of personal data 116. The number "N" of sets of personal data 116 may be the same as the number "N" of the communication devices 107. Indeed, each set of personal data 116 may correspond to a database record of a client and/or a customer and the like of an entity associated with the system 100 and/or being managed by components of the system 100, and each communication device 107 may be a communication device associated with such clients (e.g. a client may be a user of a communication device 107; hence, the terms user and client are used interchangeably hereafter); however, the number of sets of personal data 116 and the number of communication devices 107 need not be the same.

Regardless, the database 115 may comprise a database of clients and/or customers and the like of an entity associated with the system 100 and/or being managed by components of the system 100. Hence, the database 115 may include tens, hundreds, thousands, hundreds of thousands and/or millions of sets of personal data 116, or more.

Each set of personal data 116 may include personal data of a respective client, and the like, including, but not limited to text corresponding to respective names 117-1 . . . 117-N (interchangeably referred to hereafter, collectively, as the names 117 and, generically, as a name 117), text corresponding to respective network addresses 118-1 . . . 118-N (interchangeably referred to hereafter, collectively, as the network addresses 118 and, generically, as a network address 118), and the like.

As depicted, each of the names 117 stored in the personal data 116 includes a respective first name of an associated client (e.g. "Bob" and "Sally"), and each of the network addresses 118 stored in the personal data 116 includes a respective email address name of an associated client (e.g. "bob@abc.com" and "sally@123.com"), and the like. However, the personal data 116 may comprise other data associated with the user of the communication device 107, including, but not limited to, text corresponding to one or more of a name of a company at which the user works, a home address, a work address, favorite colors and/or other personal preferences, and the like. Furthermore, while the personal data 116 is described herein with respect to stored text, the personal data 116 may alternatively include graphics, including, but not limited to, an image of an associated client.

Furthermore, each set of personal data 116 may be associated with a user of a communication device 107. For example, a user of the communication device 107-1, associated with the personal data 116-1, may be named "Bob" and have an email address of "bob@abc.com"; a user of the communication device 107-2, associated with the personal data 116-2, may be named "Sally" and have an email address of "sally@123.com"

Furthermore, the personal data 116 may be associated with a user of the communication device 107, but not necessarily associated with a communication device 107. For example, a communication device 107 may comprise an email application and/or a messaging application and/or a video application (not depicted) and the like, configured to receive and send messages associated with an email address stored in the personal data 116, such an email address may be used to configure an email application and/or a messaging application and/or a video application at any communication device 107. However, the email address is not specifically associated with a given communication device 107.

In other embodiments, the personal data 116 may be associated with a user of the communication device 107, and/or associated with a specific communication device 107 of a user; for example, personal data 116 associated with a communication device 107 of a user may include, but is not limited to, a phone number of a communication device 107, a MAC (Media Access Control) address of a communication device 107, an IP (Internet Protocol) address of a communication device 107, and the like.

Furthermore each set of personal data 116 may be identified using a respective UUID, a respective GUID, and the like, which may be used to identify a specific set of personal data 116, and/or each name and/or network address and the like in each set of personal data 116 may be identified using a respective UUID, a respective GUID, and the like.

Figure 2:
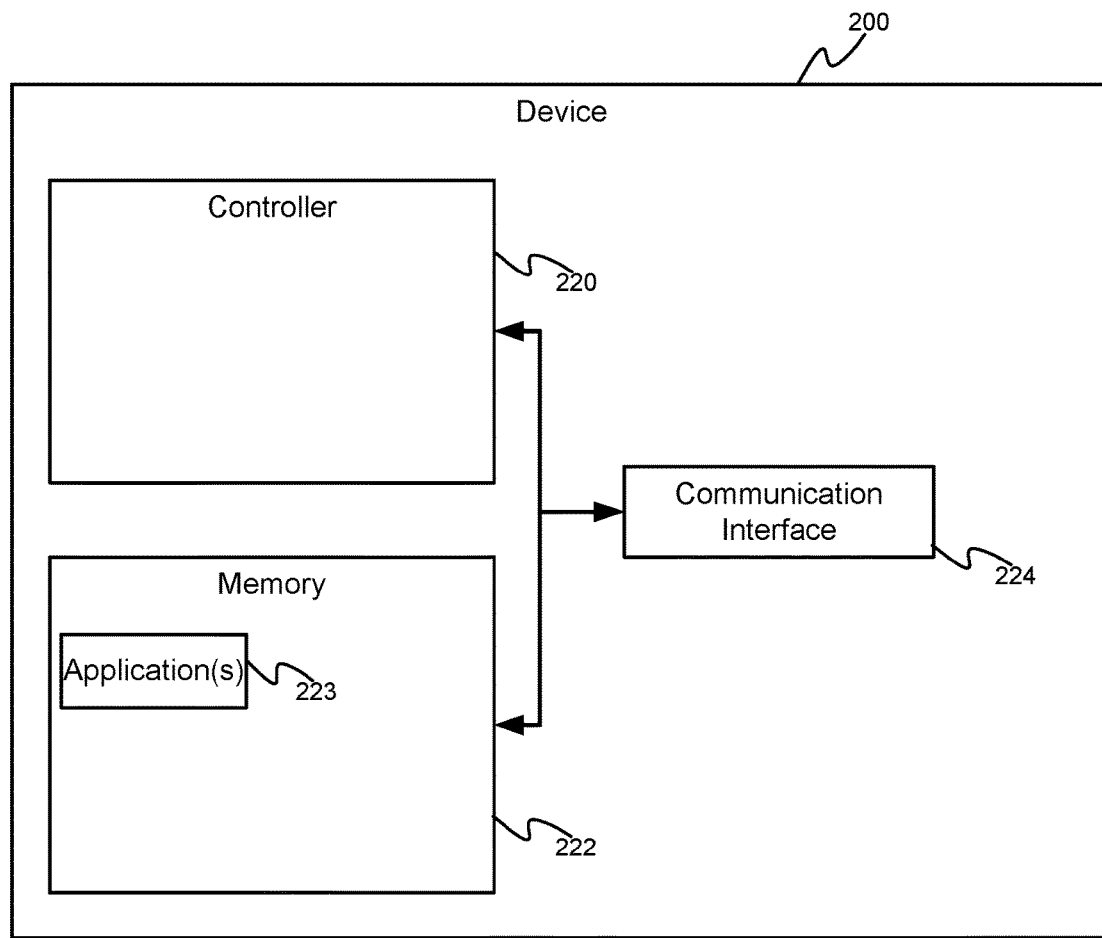
FIG. 2 depicts a device diagram showing a device structure of an electronic computing device for real-time personalization of streaming video, in accordance with some embodiments.

Attention is next directed to FIG. 2 which depicts a device diagram showing a device structure of an electronic computing device 200 for real-time personalization of streaming video according to some embodiments. The device 200 may be, for example, embodied in the computing device 101 and/or the video processing devices 105 of FIG. 1, and/or some other computing and/or communication device not illustrated in FIG. 1. Furthermore, the device 200 may be a distributed computing and/or communication device across two or more of the foregoing (or multiple of a same type of one of the foregoing) and in communication via a wired and/or wireless communication connection(s) and/or path(s); in some of these embodiments, the device 200 may be implemented in a in a cloud computing environment.

Furthermore, the communication devices 107 may have a similar device structure as the device 200, though adapted for functionality of the communication device 107; for example, while the device 200 is depicted without a display device, an input device, speakers, microphones, cameras, location determining devices (e.g. a Global Positioning System (GPS) device and the like), the device 200 may include one or more of such components. Hence, while not depicted, the device 200 may further include one or more input devices, one or more display devices, one or more speakers, one or more microphones, one or more cameras, one or more location determining devices, and/or other types of components.

The device 200 comprises a controller 220, a memory 222 storing one or more applications 223, and a communication interface 224 (interchangeably referred to hereafter as the interface 224) interconnected, for example, using a computer bus. The one or more applications 223 are generally used to implement the functionality of the device 200; when there are two or more applications 223, such applications may be used to implement the functionality of the device 200 according to different modes of operation; for example one of the applications 223 may be used to render real-time personalized video via web form requests, while another of the applications 223 may be used to respond to requests via links in email, as described in more detail below. For simplicity, the one or more applications 223 will be interchangeably referred to hereafter as the application 223.

The controller 220 can comprise a processor and/or a plurality of processors, including but not limited to one or more central processors (CPUs) and/or one or more processing units; either way, the controller 220 comprises a hardware element and/or a hardware processor. Indeed, in some implementations, the controller 220 can comprise an ASIC (application-specific integrated circuit) and/or an FPGA (field-programmable gate array) specifically configured to implement specific functionality for real-time personalization of streaming video. Hence, the device 200 is preferably not a generic computing device, but a device specifically configured to implement specific functionality for real-time personalization of streaming video. For example, the device 200 and/or the controller 220 can comprise a computer executable engine configured to implement specific functionality for real-time personalization of streaming video.

The memory 222 can comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of the device 200 as described herein are typically maintained, persistently, in the memory 222 and used by the controller 220 which makes appropriate utilization of volatile storage during the execution of such programming instructions. Those skilled in the art recognize that the memory 222 is an example of computer readable media that can store programming instructions executable on the controller 220. Furthermore, the memory 222 is also an example of a memory unit and/or memory module and/or a non-volatile memory.

In particular, the memory 222 stores the application 223 that, when processed by the controller 220, enables the controller 220 and/or the device 200 to: receive, from a communication device (for example the communication device 107), using the communication interface 224, a request for a personalized video; cause rendering of at least a subset of the personalized video segments using data for rendering the personalized video segments (for example the data 112) and incorporating personal data associated with the request (for example the personal data 116); generate, and transmit to the communication device, using the communication interface 224, a manifest identifying at least a first video segment selected according to the given order; update, and transmit to the communication device, using the communication interface 224, the manifest to identify, according to the given order, further available video segments, as rendering of each of the personalized video segments is completed; and provide, to the communication device, using the communication interface 224, as the personalized video, video segments identified in the manifest, in response to receiving requests for the video segments from the communication device.

Hence, it is understood by a person skilled in the art that such a manifest may be used in streaming video, including, but not limited to, streaming video according to the HTTP (Hypertext Transfer Protocol) Live Streaming (HLS) protocol. Hence, it is further understood by a person skilled in the art that the device 200, and the communication devices 107 to which a personalized video is provided, may each be generally configured to operate according to compatible streaming video protocols that use manifests to provide such streaming video including, but not limited to, the HLS protocol.

The communication interface 224 comprises a wired or wireless network interface which may include, but is not limited to, any suitable combination of serial ports, parallel ports, USB ports (Universal Serial Bus), and cables therefore, one or more broadband and/or narrowband transceivers, such as a cellular network transceiver, a wireless radio, a cell-phone radio, a cellular network radio, a Bluetooth™ radio, a NFC (near field communication) radio, a WLAN (wireless local area network) radio, a WiFi radio (e.g. one or more local area network or personal area network transceivers operating in accordance with an IEEE 802.11 standard (e.g., 802.11a, 802.11b, 802.11g)), a WiMax (Worldwide Interoperability for Microwave Access, operating in accordance with an IEEE 902.16 standard) radio, a packet based interface, an Internet-compatible interface, an analog interface, a PSTN (public switched telephone network) compatible interface, and the like, and/or a combination.

Figure 3:
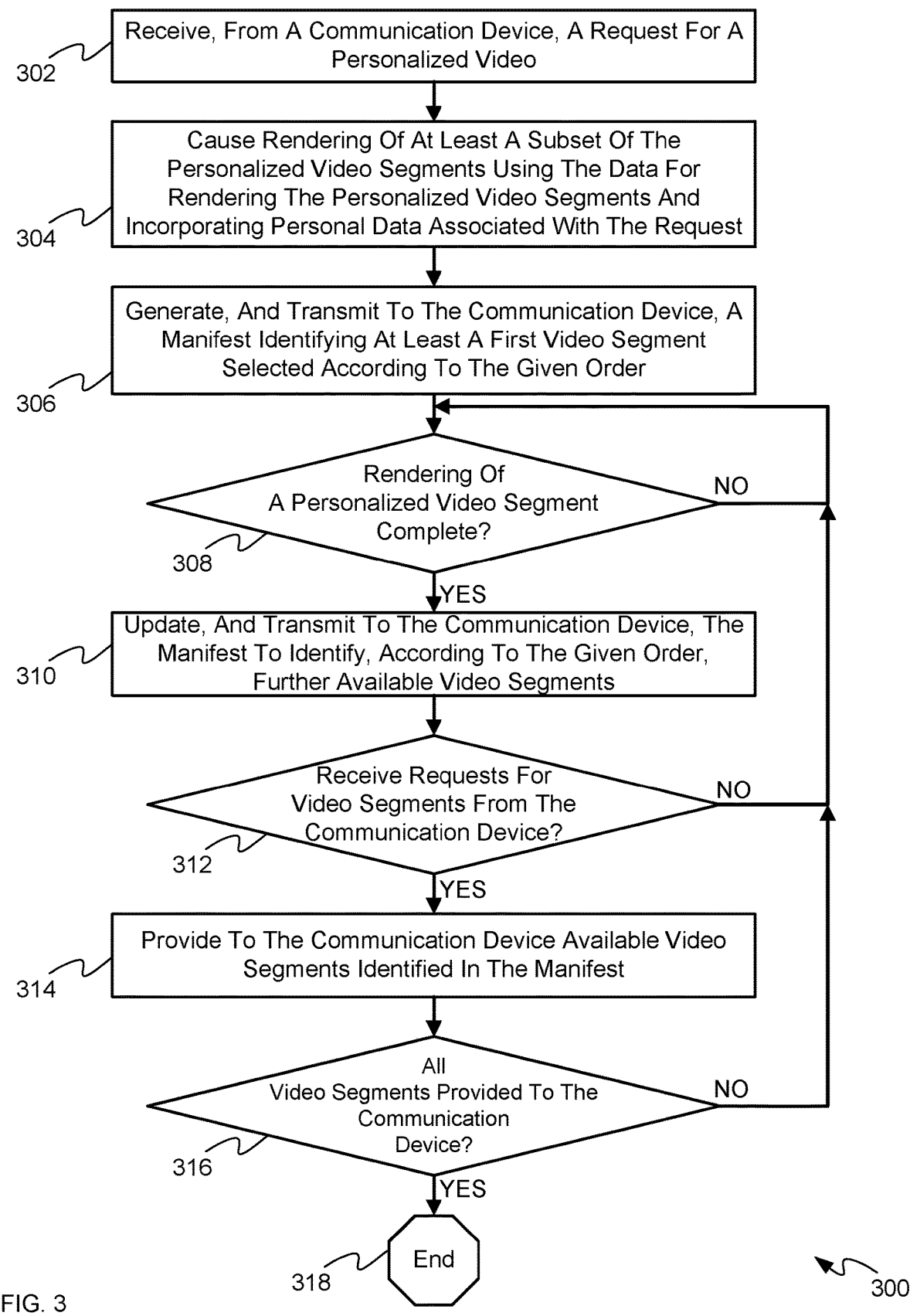
FIG. 3 depicts a flowchart of a method for real-time personalization of streaming video, in accordance with some embodiments.

Attention is now directed to FIG. 3, which depicts a flowchart of a method 300 for real-time personalization of streaming video, according to non-limiting implementations. In order to assist in the explanation of method 300, it will be assumed that method 300 is performed using the controller 220 of the device 200, for example when the controller 220 processes the application 223. Indeed, method 300 is one way in which the device 200 and/or the controller 220 can be configured. Furthermore, the following discussion of method 300 will lead to a further understanding of the device 200, and the system 100, and their various components. However, it is to be understood that the system 100 and/or the device 200 and/or the controller 220 and/or the method 300 can be varied, and need not work exactly as discussed herein in conjunction with each other, and that such variations are within the scope of present implementations.

Regardless, it is to be emphasized, that the method 300 need not be performed in the exact sequence as shown, unless otherwise indicated; and likewise, various blocks may be performed in parallel rather than in sequence; hence the elements of the method 300 are referred to herein as "blocks" rather than "steps". It is also to be understood, however, that the method 300 can be implemented on variations of the device 200 as well.

Furthermore, while it is assumed hereafter that the method 300 is performed at one device 200, the method 300 may be performed at one or more devices 200, for example at a combination of one or more of the computing device 101 and the video processing devices 105.

At a block 302, the controller 220 receives, from a communication device (for example the communication device 107), using the communication interface 224, a request for a personalized video.

At a block 304, the controller 220 causes rendering of at least a subset of the personalized video segments using data for rendering the personalized video segments (for example the data 112) and incorporating personal data associated with the request (for example the personal data 116 and/or personal data received in the request of the block 302). Rendering of personalized video segments is described in more detail below with respect to FIG. 4, FIG. 5 and FIG. 6.

The rendering may be performed in parallel using the video processing devices 105. For example, the controller 220 may retrieve the data 112 and the personal data 116 that is respective to a communication device that transmitted the request received at the block 302, and cause the rendering of each personalized video segment to occur in parallel using the video processing devices 105. Control of the video processing devices 105 may occur by way of the device 200 retrieving the data 112 from the memory 103, and retrieving the personal data 116 to be used in rendering the personalized video segment from the databases 115, and passing the data 112 and the personal data 116 to the video processing devices 105. Alternatively, and/or in addition, control of the video processing devices 105 may occur by way of the device 200 providing JSON (JavaScript Object Notation), XML (Extensible Markup Language) and the like to the video processing devices 105; for example the JSON and/or the XML may instruct the video processing devices 105 to retrieve the data 112 and the personal data 115 from locations of the memory 103 and the database 115. Such JSON and/or XML may be used with UUIDs and/or GUIDs and the like identifying the data 112 and personal data 116 at the memory 103 and/or the database 115. Such UUIDs and/or GUIDs and the like may be received with the request at the block 302.

When the personalized video segments are rendered in parallel, the controller 220 may cause parallel processing resources (e.g. the video processing devices 105) to complete rendering of the personalized video segments according to the given order. For example, the controller 220 may cause the video processing devices 105 to render a respective personalized video segment from the first set of data 112-1 in a manner that causes the respective personalized video segment rendered from the first set of data 112-1 be completed prior to other personalized video segments rendered from the other data 112. In other words, as the data 112-1 is for rendering a second video segment of the personalized video, the controller 220 may cause the parallel processing resources to complete rendering the second segment prior to completing rendering further personalized segments.

Furthermore, the personal data used to render a personalized video segment may be retrieved from the personal data 116 stored in the database (e.g. using a respective network address, UUID, and the like, received with the request of the block 302); for example, in these embodiments, the request received at the block 302 may include a network address 118 stored in the personal data 116, a UUID identifying the personal data 116, and the like, which may be used to retrieve a corresponding name 117, and the like, from the personal data 116, for example in a database look-up process, and the like. For example, in these embodiments, a message, such an email, and the like, may be transmitted to a communication device, the message including a link for initiating a request for a personalized video from the device 200; when the link is actuated, the request may be transmitted to the device 200 (e.g. via an associated network address in the link), the request including a network address of the communication device, UUIDs and/or GUIDs, and the like, identifying the personal data 116 to be used when generating a personalized video, and/or the segments 111 and/or the data 112 to be used when generating a personalized video. Furthermore, such UUIDs and/or GUIDs, and the like may be included in the message transmitted to the communication device.

Alternatively, the personal data used to render a personalized video segment may be received with the request of the block 302; for example, in these embodiments, the request received at the block 302 may include text corresponding to a name to be used to render the personalized video segments and/or a graphic (e.g. an image of a user) to be used to render the personalized video segments. In these embodiments, for example, a user of a communication device transmitting a request may fill out a form, such as a webform, and the like, requesting a personalized video, the form including fields for receiving personal data to be used to render a personalized video, such as a name, an image, and the like; the form may further include a virtual button, a link, and the like, for initiating a request for a personalized video from the device 200; when the virtual button, the link, and the like, is actuated, the request may be transmitted to the device 200 (e.g. via a network address associated with the virtual button), the request including the personal data to be used to render a personalized video. Alternatively, the webform may include code, such as javascript and the like, which causes data received in fields to be pre-submitted to the device 200; such a webform may comprise a multi-stage webform, and the like, the data from which is fully submitted when the virtual button, the link, and the like, is actuated.

At a block 306, the controller 220 generates, and transmits to the communication device, using the communication interface 224, a manifest identifying at least a first video segment selected according to the given order. The manifest may comprise a link, such as a URL (Uniform Resource Locator), and the like, to the first video segment. For example, with reference to FIG. 1, a link in the manifest may include a URL to the first nonpersonalized video segment 111-1 as stored in the memory 103; alternatively, the first nonpersonalized video segment 111-1 may be retrieved by the device 200 and temporarily stored at a memory of the device 200 (e.g. at the memory 222) and a link to the first nonpersonalized video segment 111-1 stored at the device 200 may be provided in the manifest.

In some embodiments, as depicted in FIG. 1, the first video segment is the nonpersonalized video segment 111-1. Indeed, the personalized video to be provided may be specifically selected such that the first video segment is a prerendered nonpersonalized video segment so that the first video segment is immediately available to be provided to the requesting communication device.

However, the first video segment may alternatively be a personalized video segment to be rendered from a set of data 112. Hence, when the request is received at the block 302, rendering of the first video segment is initiated and the manifest identifying at least the first video segment may be transmitted whether the first video segment has completed rendering, or not. In these embodiments, the link to the first video segment may be a link and/or URL to a personalized video segment that is not yet available. However, when the rendering of the first video segment is complete, the controller 220 associates the completed first video segment with the link to the first video segment in the manifest.

At a block 308, the controller 220 determines whether rendering of a personalized video segment is complete, for example a next personalized video segment according to the given order. When rendering of a personalized video segment is not complete (a "NO" decision at the block 308), the controller 220 continues to monitor for completion of rendering of a personalized video segment at the block 308.

When rendering of a personalized video segment is complete (a "YES" decision at the block 308), at a block 310, the controller 220 updates, and transmits to the communication device, the manifest to identify, according to the given order, further available video segments. For example, each instance of a next personalized video segment is completed, according to the given order, the manifest is updated to identify the next personalized video segment, as well as any prerendered nonpersonalized video segments 111 that follow the next personalized video segment. Furthermore, when the manifest is updated to identify a last video segment in the personalized video, the manifest may be updated to identify that no further segments will be added (for example, an HLS manifest may include an "ENDLIST" indicator), and the like.

At a block 312, the controller 220 determines whether a request for video segments is received from the communication device. When a request for the video segments is not received from the communication device (a "NO" decision at the block 312), the controller 220 continues to monitor for completion of rendering of a personalized video segment at the block 308.

When a request for the video segments is received from the communication device (a "YES" decision at the block 312), at a block 314, the controller 220 provides, to the communication device, as the personalized video, video segments identified in the manifest, in response to receiving requests for the available video segments from the communication device.

In general, requests for video segments received from the communication device may comprise the links to video segments provided in the manifest, and a communication device requesting the video segments generally requests the video segments in the order of the links in the manifest, which is generally the given order of the nonpersonalized video segments and the personalized video segments. Hence, for example, a communication device receiving a manifest may request the video segments using the links in the manifest requested in the order of the links in the manifest (e.g. a video segment associated with a first link is requested first, a video segment associated with a second link is requested second, etc.).

In embodiments where the request for the video segments received from the communication device is for the first video segment (e.g. the link to the first video segment), and the first video segment is a prerendered nonpersonalized video segment, such as the nonpersonalized video segment 111-1, the controller 220 transmits and/or streams the first video segment upon receiving the request.

However, in embodiments where the request for the video segments received from the communication device is for the first video segment, and the first video segment is a personalized video segment where rendering is not yet completed, the controller 220 may transmit an error message (e.g. a "404 Not Found" error message, and the like) to the requesting communication device. At communication devices operating according to some streaming protocols, receipt of such an error message causes a communication device to again request the video segment that caused the error message. Alternatively, when a requested video segment is not received within a given time period, and the like, the communication device requesting the video segment will resubmit the request for the video segment until received and/or a timeout occurs; indeed, communication devices configured to operate in this manner will continue to request video segments until it is identified that no further video segments are available (e.g. the HLS "ENDLIST" identifier in the manifest is reached). Hence, this process may automatically continue between the controller 220 and the requesting communication device until rendering of the personalized video segment is complete and the controller 220 provides the personalized video segment to the communication device.

At a block 316, the controller 220 determines whether all video segments in the personalized video have been provided to the communication device. When all video segments in the personalized video have not yet been provided to the communication device (a "NO" decision at the block 316), the controller 220 may repeat one or more of the blocks 308, 310, 312, 314.

However, the controller 220 generally stops executing the blocks 308, 310 once rendering of all the personalized video segment is complete, but continues to monitor for requests at the block 312, presuming not all video segments in the personalized video have been provided to the communication device. Indeed, once rendering of all the personalized video segment is complete a "NO" decision at the block 312 may result in the block 312 being repeated by the controller 220 until a request is received (e.g. a "YES" decision at the block 312). Once all the available video segments are provided (a "YES" decision at the block 316), the controller 220 ends the method 300 at a block 318.

While the method 300 has been described with respect to each personalized video segment being rendered independent of one another, in some embodiments the controller 220 determines whether any portions and/or layers and/or content of previously rendered personalized video segments are shared with personalized video segments to be rendered, for example by "pre-processing" the data 112 and/or the personal data 116 to determine personalized video segments that share content; such "pre-processing" the data 112 and/or the personal data 116 may occur when the request for the personalized video is received at the block 302, prior to rendering at least a subset of the personalized video segments at the block 304 and/or receiving requests for video segments at the block 312. Such pre-processing may include comparing a set of data 112 with the other sets of data 112 to determine portions and/or layers and/or content that are shared.

When personalized video segments share any portions and/or layers and/or content, such shared content may be rendered once, for example when rendering a first personalized video segment that includes the shared content, and reused when rendering later personalized video segment that includes the shared content. In some of these embodiments, some personalized video segments may be the same as each other (e.g. respective data 112 is the same for each of a plurality of personalized video segments) and such personalized video segments may be rendered once and provided at the block 314 each time a request is received, at the block 312, for a personalized video segment that is the same as a previously rendered personalized video.

Figure 4:
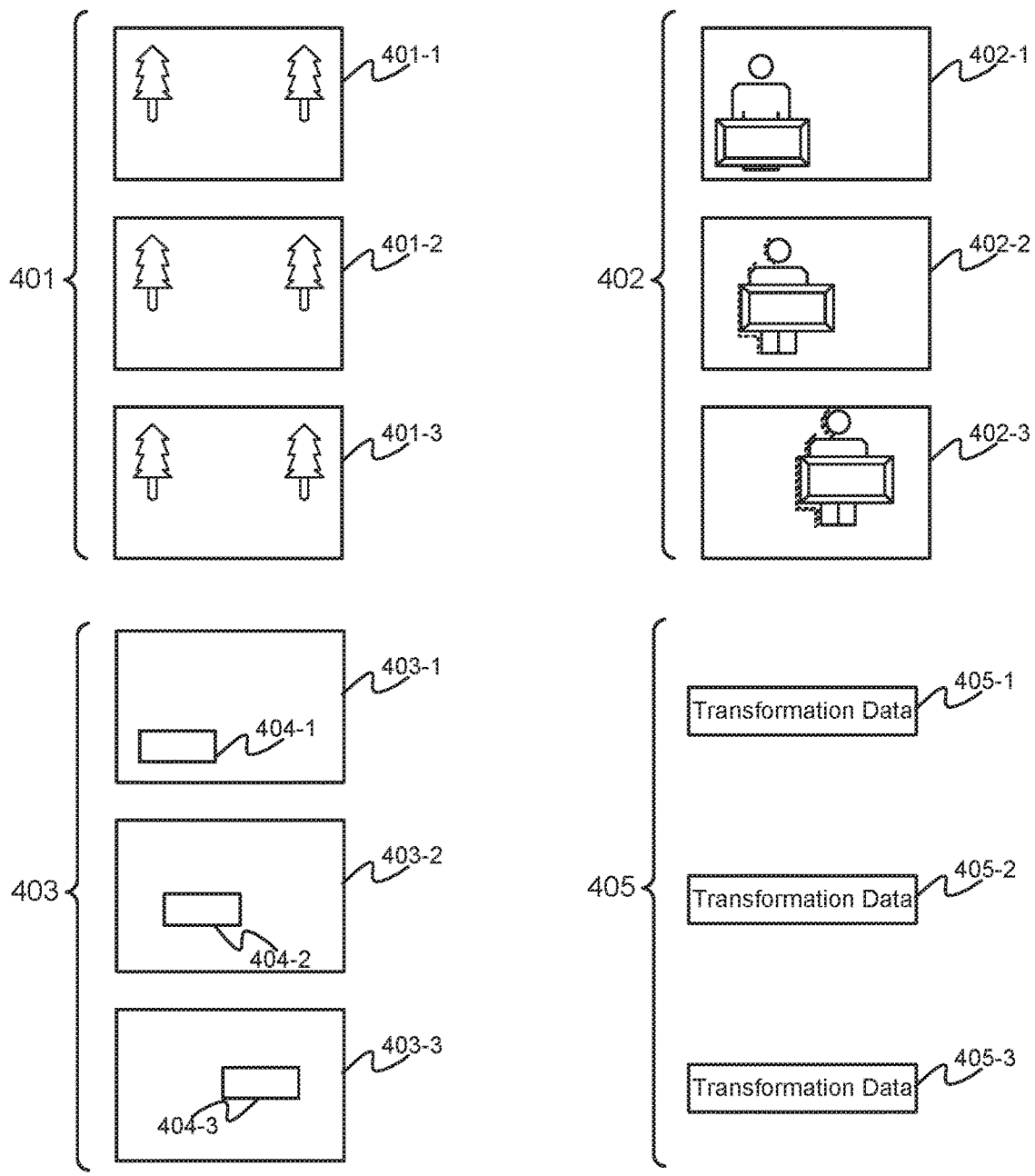
FIG. 4 depicts example data for rendering a personalized segment of a streaming video, in accordance with some embodiments.
Figure 5:
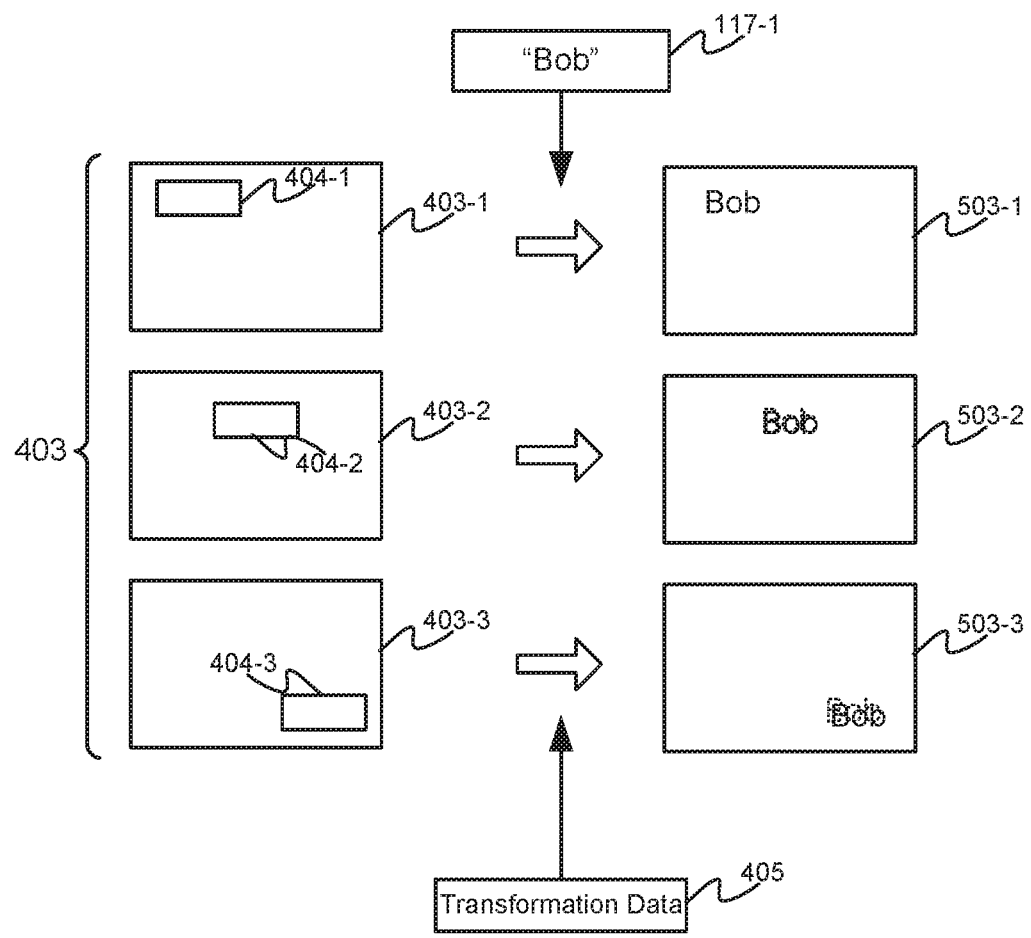
FIG. 5 depicts an example of rendering a personalized layer of a personalized segment of a streaming video, in accordance with some embodiments.
Figure 6:
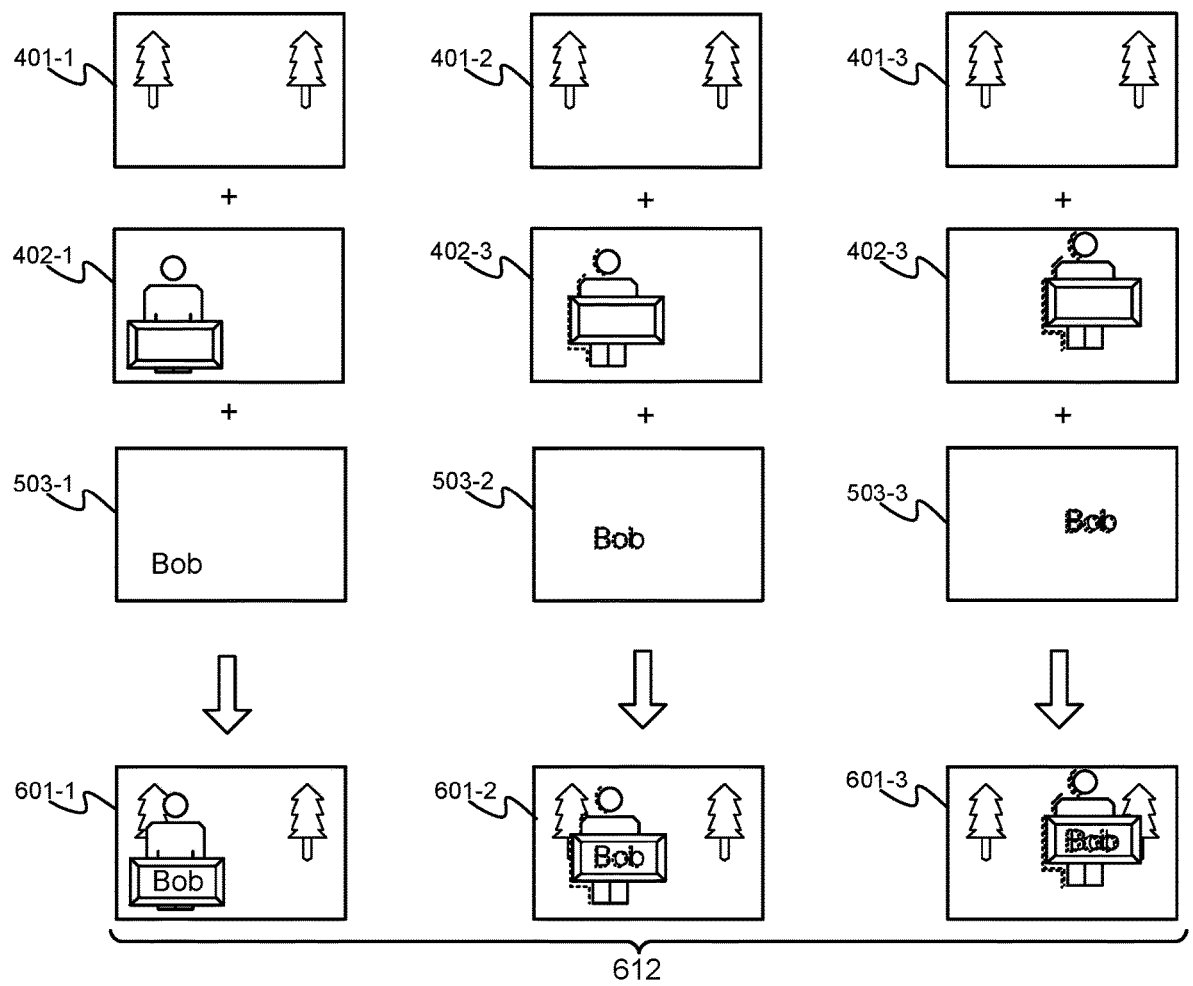
FIG. 6 depicts an example of rendering a personalized segment of a streaming video using the personalized layer of FIG. 5, in accordance with some embodiments.

Prior to discussing example embodiments of the method 300, rendering of personalized video segments at the block 304 is described with respect to FIG. 4, FIG. 5, and FIG. 6. A person of skill in the art will understand that in FIG. 4, FIG. 5 and FIG. 6, rendering of personal video segments may occur at one or more of the video processing devices 105 using, for example, any suitable application for rendering personal video segments, which may include components of the application 223 and/or another application.

Attention is next directed to FIG. 4 which depicts an example set of data 112 comprising: prerendered static layers 401-1, 401-2, 401-3 (interchangeably referred to hereafter, collectively, as the prerendered static layers 401 and, generically, as a prerendered static layer 401) and prerendered non-static layers 402-1, 402-2, 402-3 (interchangeably referred to hereafter, collectively, as the prerendered non-static layers 402 and, generically, as a prerendered non-static layer 402). Each of the layers 401, 402 may comprise a respective layer of one or more frames of a personalized video segment. While example embodiments are described with respect to a personalized video segment having three frames, a personalized video segment may comprise any number of frames.

For example, the personalized video segment to be rendered using the example data 112 depicted in FIG. 4 comprises three frames, with the prerendered static layers 401 being a static layer of each of the three frames. For example, the prerendered static layer 401 includes objects (e.g. as depicted trees) which do not generally move from frame to frame, other than, for example, small differences therebetween (e.g. the trees subtly moving with wind, and the like; indeed, regardless of the content of the prerendered static layers 401 being strictly static or not, frames in videos tend to change, even for static content). While three prerendered static layers 401 are depicted (e.g. one for each frame), in other embodiments, one prerendered static layer 401 may be provided, which is used for each frame (e.g. the same layer may be incorporated into each of the three frames).

The three prerendered non-static layers 402 may each comprise a respective non-static layer of each of the three frames (e.g. the prerendered non-static layer 402-1 is a non-static layer of the first frame, the prerendered non-static layer 402-2 is a non-static layer of the second frame, and prerendered non-static layer 402-3 is a non-static layer of the third frame). Each of the non-static layers 402 include, for example, a moving object (e.g. as depicted a person holding a whiteboard, a sign, and the like, and referred to hereafter as a "whiteboard") which moves from frame to frame; as such the moving object in each of the non-static layers 402 has had a transformation applied so that the moving object has a "blur" (represented by dotted lines) from the first frame to the second frame to the third frame.

In general, each of the layers 401, 402 have been prerendered and stored in the example data 112.

However, a personalized layer has not yet been rendered. As such, the example data 112 depicted in FIG. 4 further includes personalizable layers 403-1, 403-2, 403-3 (interchangeably referred to hereafter, collectively, as the personalizable layers 403 and, generically, as a personalizable layer 403) each of which includes a respective field 404-1, 404-2, 404-3, and the like (interchangeably referred to hereafter, collectively, as the fields 404 and, generically, as a field 404). Each of the fields 404 may be populated with personal data (for example a name 117 and/or text (not shown) from the personal data 116 and/or a graphic (not shown) stored in the personal data, and/or text and/or a graphic received with a request from a communication device), when rendering a personalized layer from each of the personalizable layers 403. In other words, each of the personalizable layers 403 are used to render a respective personalized layer for each of the frames In some embodiments a position of a field 404 may be static from layer to layer (e.g. the personal data does not move from frame to frame); in these embodiments, only one personalizable layer 403 may be provided and used to render one personalized layer to be used in all the frames.

However, as depicted, the field 404 moves from layer to layer; in other words, in each of the personalizable layers 403, a respective field 404 is in a different position. Hence, the data 112 further includes transformation data 405-1, 405-2, 405-3 (interchangeably referred to, hereafter, collectively as the transformation data 405 and, generically, as a set of transformation data 405) which may comprise an algorithm and/or data for transforming the personalized data in the respective fields 404 for each respective personalizable layer 403, for example when rendering a respective personalized layer. For example, such a respective personalized layer (e.g. rendered from each of the personalizable layers 403) may be transformed according to one or more of a previous respective personalized layer and a next respective personalized layer. In particular, the set of transformation data 405-1 is for transforming personalized data in the fields 404-1 of the personalizable layer 403-1, the set of transformation data 405-2 is for transforming personalized data in the fields 404-2 of the personalizable layer 403-2, and the set of transformation data 405-3 is for transforming personalized data in the fields 404-3 of the personalizable layer 403-3. The transformation data 405 may indicate how text and/or graphics of personal data in a respective field 404 is to be transformed in each of personalized layers to better render movement of the text and/or graphics of personal data between the frames, and/or to customize the text and/or graphics for rendering onto an object in the non-static layers 402 (e.g. for example the transformation data 405 may be for warping and/or shaping the text and/or graphics for compatibility with the object). Non-limiting examples of such transformation data 405 include, but are not limited to, any algorithms and/or data for blurring text and/or graphics opposite a direction of movement from frame to frame. Furthermore, each set of transformation data 405 may be generated when the layers 403 are generated. In some embodiments, a set of transformation data 405 may comprise an empty set and/or may not be present, for example when no transformation is to occur for a given field 404 (e.g. when a field 404 doesn't move from frame to frame).

Furthermore, while positions of the fields 404 are depicted as being coupled with movement of the objects in the non-static layers 402 (e.g. such that a field 404 aligns with a position of the whiteboard, in the non-static layers 402), positions of the fields 404 may be decoupled with the positions of the objects in the non-static layers 402. As will be described below, a name of a client from personal data may be rendered on the whiteboard of the non-static layers 402, with the positions and sizes of the fields 404 being similar to the sizes of whiteboard in the non-static layers 402; however, a name of a client may alternatively move independent of the whiteboard.

Furthermore, the example data 112 of FIG. 4 may include any additional data for rendering the personal data (which may be stored in the transformation data 405), including, but not limited to, a font to be used with text, a size of the text, a color of the text, a background color of the text, and the like. For example, when a name of a client is to be rendered on the whiteboard of the non-static layers 402, the data 112 may include additional data indicating that the font for the name is to be of a size that fits the name onto the whiteboard, with a color that is different from that of the whiteboard and a background color that is transparent and/or a similar color of the whiteboard. Furthermore, the text size may be variable, for example to "fit" the name onto the whiteboard, with shorter names being rendered in a large font relative to longer names rendered in a smaller font. Furthermore, while the example "whiteboard" of the non-static layers 402 is flat, in other embodiments an object of the non-static layers 402 onto which personal data may be rendered may be curved with the personal data warped and/or transformed accordingly (e.g. as stored in the transformation data 405). Furthermore, in some embodiments, in some frames the text and/or graphics of the personal data used in the fields 404 may be partially occluded, for example when a "person" and/or another object moves "in front" of the object onto which the personal data is rendered; data for rendering the personal data in the fields 404 when such occlusion occurs may be stored in the transformation data 405.

Attention is next directed to FIG. 5 which depicts an example rendering of respective personalized layers 503-1, 503-2, 503-3 (interchangeably referred to, hereafter, collectively, as the personalized layers 503 and, generically, as a personalized layer 503) of each of three frames, from: the personalizable layers 403, the name 117-1 of the personal data 116-1, and the transformation data 405. The rendering depicted in FIG. 5 may be performed by one or more of the video processing devices 105.

In particular, the name "Bob" is inserted into each of the fields 404 to render a respective personalized layer 503 of each of the three frames, with the transformation data 405 used to "blur" the name "Bob" (the blurring represented by broken lines), opposite a direction of movement of the name "Bob" between the personalized layers 503. For example, the name "Bob" is moving up and to the right from the personalized layer 503-1 to the personalized layer 503-2, hence, the name "Bob" is blurred down and to the left in the personalized layer 503-2, the transformation data 405-2 defining such blurring; similarly, the name "Bob" continues to move up and to the right from the personalized layer 503-2 to the personalized layer 503-3, hence the name "Bob" is blurred down and to the left in the personalized layer 503-3, the transformation data 405-3 defining such blurring. As the name "Bob" appears to be moving faster between the personalized layers 503-2, 503-3, then compared to between the personalized layers 503-1, 503-2, there may be more blurring in the personalized layer 503-3, as compared to the personalized layer 503-2 (e.g. as depicted), as defined in the transformation data 405. As the name "Bob" is initially still and/or static in the personalized layer 503-1, the transformation data 405-1 may be omitted and/or may be an empty set, and/or may define blurring that may be provided in the personalized layer 503-1 that corresponds to any blurring in the corresponding non-static layer 403-1.

Attention is next directed to FIG. 6 which depicts rendering of example frames 601-1, 601-2, 601-3 of a personalized video segment from the example layers 401, 402, 503 of FIG. 4 and FIG. 5. The frames 601-1, 601-2, 601-3 are interchangeably referred to, hereafter, collectively, as the frames 601 and, generically, as a frame 601.

The rendering depicted in FIG. 6 may be performed by one or more of the video processing devices 105.

In particular, in FIG. 6 a first frame 601-1 is rendered by combing the first prerendered static layer 401-1 with the first prerendered non-static layer 402-1 and the first personalized layer 503-1, for example by flattening the three layers 401-1, 402-1, 503-1 into the frame 601-1. Similarly, a second frame 601-2 is rendered by combing the second prerendered static layer 401-2 with the second prerendered non-static layer 402-2 and the second personalized layer 503-2, for example by flattening the three layers 401-2, 402-2, 503-2 into the frame 601-2. Similarly, a third frame 601-3 is rendered by combing the third prerendered static layer 401-3 with the third prerendered non-static layer 402-3 and the third personalized layer 503-3, for example by flattening the three layers 401-3, 402-3, 503-3 into the frame 601-3. The frames 601 may then be combined to form a personalized video segment 612.

In yet further embodiments, the respective layers 401, 402 for each frame 601 may be combined and stored in the data 112, for example, when generating the data 112. In other embodiments, the respective layers 401, 402 for each frame 601 may be combined while the personalized layers 503 are being generated. In yet further embodiments, more layers may be added to the frames 601 including, but not limited to, layers where objects occlude the personalized data, such layers being "on top" of the personalized layers 503. In yet further embodiments, when the movement of personalized data is decoupled from the movement of objects in the non-static layers 402, and the objects in the non-static layers 402 are to occlude the personalized data in the personalized layers 503, one or more of the non-static layers 402 (e.g. the non-static layers 402 that provide such occlusion), maybe "on top" of the personalized layers 503. Indeed, the various layers of the frames 601 may be combined in any suitable manner, with data 112 including data defining an order of the layers when combining into the frames 601.

While rendering of the personalized video segment 612 is described with respect to one field 404 in the personalizable layers 403, the personalizable layers 403 may include more than one field 404, for example for including other text and/or graphics from the personal data 116 including, but not limited to, names of companies and the like. Furthermore, other data from the personal data 116 may be used to customize text and/or graphics incorporated into the fields 404 including, but not limited, to favorite colors, and the like, from the personal data 116; for example, the text "Bob" of the name 117-1 may be rendered in a color stored in the personal data 116-1 as a favorite color.

FIG. 4, FIG. 5 and FIG. 6 hence show an example embodiment of the block 304 in which rendering of a personalized video segment occurs by: retrieving, from the data 112 for rendering personalized video segments, one or more of a respective prerendered static layer and a respective prerendered non-static layer; rendering a respective personalized layer using the personal data; and combining one or more of the respective personalized layer and the respective prerendered non-static layer.

Similarly, FIG. 4, FIG. 5 and FIG. 6 further show an example embodiment of the block 304 in which rendering of a personalized video segment occurs by: retrieving, from the data 112 for rendering personalized video segments, transformation data; and rendering the respective personalized layer using the personal data, and according to the transformation data, such that the respective personalized layer is transformed according to one or more of a previous respective personalized layer and a next respective personalized layer.

Techniques similar to those described with respect to FIG. 4, FIG. 5 and FIG. 6 may also be used to render a personalized icon using text and/or graphics stored in the personal data 116, one or more of the layers 401, 402 and the icon data 113. For example, attention is next directed to FIG. 7 which depicts rendering of a personalized icon 701. In particular, an example of the icon data 113 includes a "Play" symbol (e.g. a triangle which may represent a virtual button for "playing" a video") and a field 704 on the symbol which may be populated, as depicted, with the name 117-2, similar to as described above with respect to the fields 404 being populated by the name 117-1. As depicted, a video processing device 105 and/or the computing device 101 (e.g. the device 200 implementing one or more of the applications 223) may combine the layer 401 (and/or one or more of the layers 402) with the icon data 113 with the field 704 populated with the name 117-2, to render the personalized icon 701. As depicted, the personalized icon 701 includes the name "Sally" appearing on the "Play" symbol with the image of the prerendered static layer 401 used as a background. The personalized icon 701 may be temporarily stored in a memory of the system 100 and/or incorporated into an email, message and the like transmitted to a communication device 107 of the client associated with the name 117-2, along with an associated link for requesting a personalized video. Alternatively, the personalized icon 701 may be rendered without the icon data 113 or without the one or more of the layers 401, 402.

The method 300 is next described with respect to FIG. 8 to FIG. 13, each of which are substantially similar to FIG. 1 with like elements having like numbers. A person of skill in the art will understand that in FIG. 8 to FIG. 13, a controller of the computing device 101 is implementing the application 223 and/or that in FIG. 8 to FIG. 13 the device 200 is embodied in the computing device 101 and/or that the controller 220 of the device 200 is embodied in a controller of the computing device 101.

Figure 8:
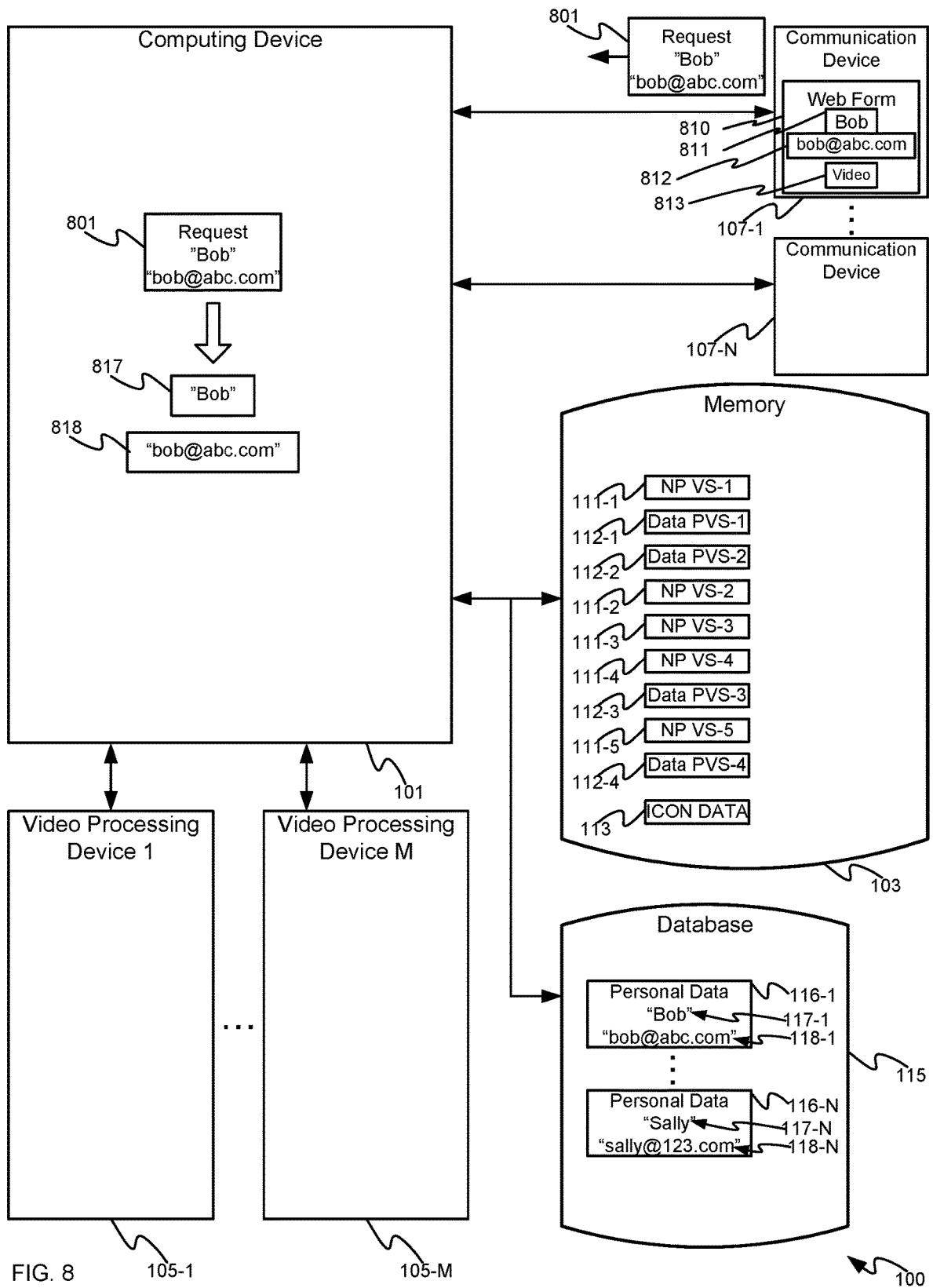
FIG. 8 depicts an example of initiating rendering of a personalized video via a webform, in accordance with some embodiments.

Attention is next directed to FIG. 8 which depicts example embodiments of the block 302 of the method 300.

In the depicted example embodiment, the computing device 101 is receiving (e.g. at the block 302 of the method 300) a request 801 for a personalized video from the communication device 107-1. For example, as depicted, a webform 810 is being provided at the communication device 107-1 (e.g. at a display device thereof), for example in a browser application; in particular, a user of the communication device 107-1 may be browsing the Internet and load the webform 810 into a browser due to an interest in a product, service, and the like being provided by an entity associated with the nonpersonalized video segments 111 and the data 112. The user may use the webform 810 to request a personalized video. Such a user may or may not have a pre-existing relationship with an entity providing the webform 810 and hence data of the user may or may not be stored in the personal data 116.

As depicted, the webform 810 includes a field 811 for inputting a name (e.g. "Bob"), for example using an input device of the communication device 107-1, and/or a field 812 for inputting an email address (e.g. "bob@abc.com"). The webform 810 further includes an optional virtual button 813, and the like, which, when actuated, (e.g. using an input device of the communication device 107-1) causes the communication device 107-1 to transmit the request 801 to the computing device 101, with the name and the email address entered in the respective fields 811, 812. The request 801 may further include a rendered version of the webform 810 with the fields 811, 812 "filled in" with the name and the email address. The optional virtual button 813 is hence associated with a network address of the computing device 101 such that the request 801 is automatically transmitted to the computing device 101 when the optional virtual button 813 is actuated. However, any actuatable link, and the like, may be used in place of the virtual button 813 and/or the webform 810 may submit data entered in the fields 811, 812 as entered and automatically transmit the request 801 without actuation of a virtual button, a link, and the like, in the webform 810 (indeed, in these embodiments, an actuatable virtual button, link, and the link may not be present in the webform 810).

The request 801 may further include a file type (e.g. MPEG2TS, MP4, and the like), a frame rate, a resolution and the like of a personalized video being requested.

The request 801 may further comprise one or more identifiers of the personalized video to be generated, for example one or more UUIDs, GUIDs, and the like identifying the segments 111 and the data 112; such UUIDs and/or GUIDs, and the like may be incorporated into the webform 810.

As also depicted in FIG. 8, the request 801 is received at the computing device 101 and personal data such as a name 817 (e.g. "Bob") and an email address 818 (e.g. "bob@abc.com") is extracted from the request 801. Alternatively, the email address 818 may be used to extract the name 117-1 from the personal data 116-1 for example using a database lookup and the like (presuming that the user of the communication device 107-1 has a pre-existing relationship with an entity providing the webform 810). In other words, as depicted, the name 817 is the same as the name 117-1 and the email address 818 is the same as the network address 118-1.

However, in other embodiments, there need not be a corresponding set of personal data 116 for the email address 818; rather, the personal data used to render a personalized video may be received via the request 801 without a database lookup and the like.

Furthermore, a person of skill in the art will further understand that the webform 810 and the request 801 are specifically for requesting a personalized video to be generated from the nonpersonalized video segments 111 and the data 112. When the memory 103 stores other sets of nonpersonalized video segments and the data for rendering personalized video segments, other webforms may be used to request personalized videos from those other sets. Hence, the request 801 may include an identifier identifying the personalized video to be generated from the nonpersonalized video segments 111 and the data 112.

Figure 9:
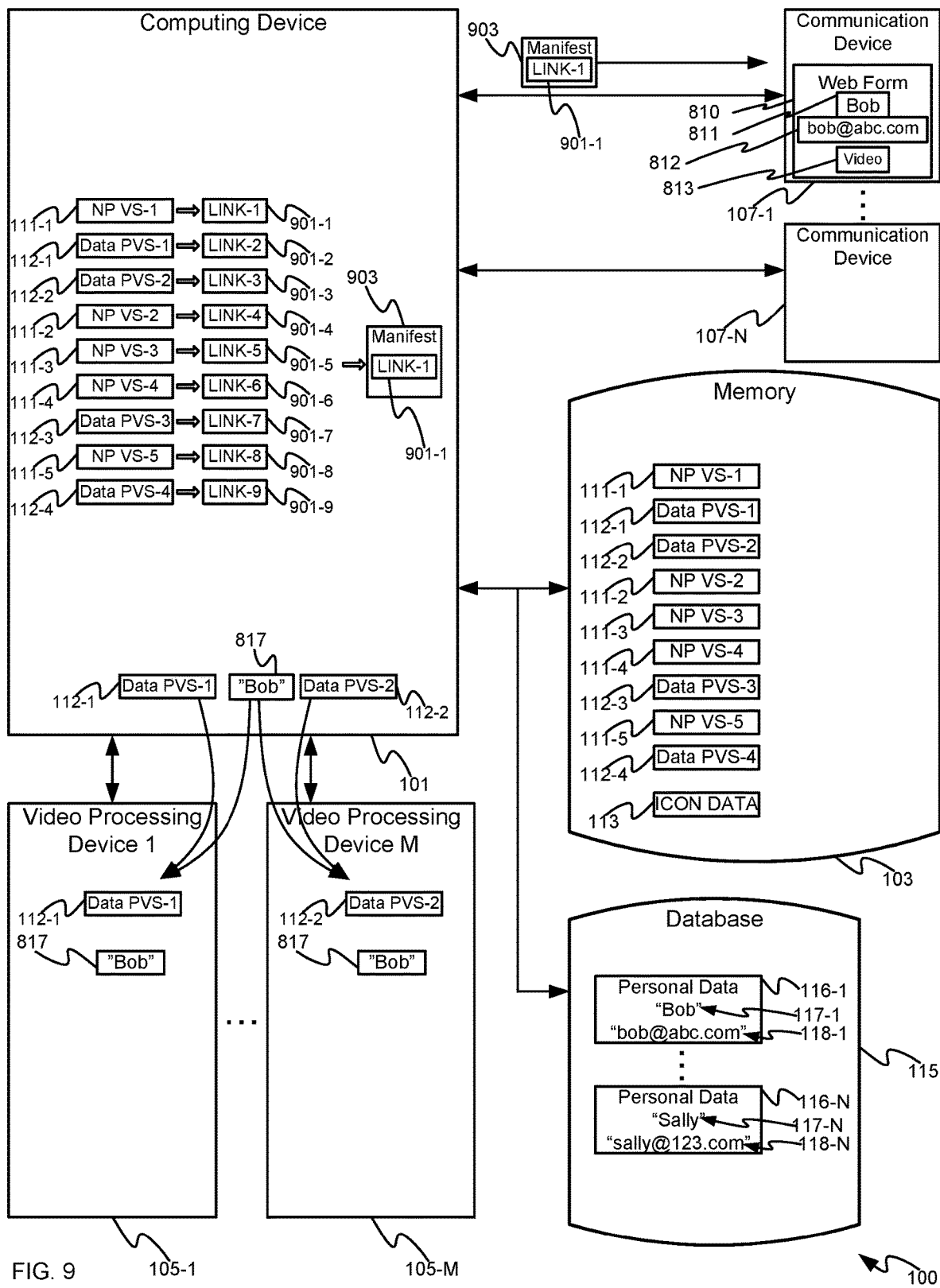
FIG. 9 depicts generating an example initial manifest when initiating rendering of a personalized video via a webform, in accordance with some embodiments.

Attention is next directed to FIG. 9 which depicts example embodiments of the block 304 and the block 306 of the method 300.

As depicted, the computing device 101 has retrieved the nonpersonalized video segments 111 and the data 112 from the memory 103, for example in response to receiving the request 801. While the present example embodiment is described with respect to the computing device 101 having retrieved the nonpersonalized video segments 111 and the data 112 from the memory 103, the computing device 101 may alternatively not retrieve the nonpersonalized video segments 111 and the data 112 from the memory 103 but rather control the various components of the system 100 to retrieve data from the memory 103 using JSON and/or XML (each of which may use UUIDs, GUIDs and the like to identify data from the memory 103 and/or the database 115), and the like, and/or using links to the nonpersonalized video segments 111 and the data 112 from the memory 103 as stored in the memory 103.

As further depicted in FIG. 9, the computing device 101 is providing (e.g. at the block 304 of the method 300) at least the data 112-1 to the first video processing device 105-1 along with the name 817 (e.g. the data to be used to render a respective personalized video segment) and/or an identifier (e.g. a link) of the name 817 in a rendered version of the webform 810 received, for example, in the request 801 (which may be temporarily stored at a memory of the computing device 101, the memory 103 and/or the database 115 and/or another memory). Similarly, the computing device 101 is providing (e.g. at the block 304 of the method 300) the data 112-2 to the video processing device 105-M along with the name 817. Each of the video processing devices 105 proceed to render a respective personalized video segment as described above with respect to FIG. 4, FIG. 5 and FIG. 6, using the text "Bob".

While as depicted only the first two sets of data 112-1, 112-2 are provided to the video processing devices 105 to render a first two personalized video segments (e.g. in parallel), in other embodiments, all the data 112 may be provided to respective video processing devices 105 to render all the personalized video segments (e.g. in parallel), assuming that the number "M" of video processing devices 105 is greater than or equal to the number "4" of sets of data 112. When the number "M" of video processing devices 105 is less than the number "4" of sets of data 112, the computing device 101 may generally cause parallel processing resources (e.g. the video processing devices 105) to complete rendering of the personalized video segments according to the given order such that rendering of the first personalized video segment (from the data 112-1) is completed at least first, rendering of the second personalized video segment (from the data 112-2) is completed at least second, etc. However, generally, the computing device 101 may generally cause parallel processing resources (e.g. the video processing devices 105) to render all the personalized video segments concurrently.

As further depicted in FIG. 9, the computing device 101 is generating a respective link 901-1, 901-2, 901-3, 901-4, 901-5, 901-6, 901-7, 901-8, 901-9 which identifies each of the respective nonpersonalized video segments 111 and personalized video segments to be rendered from each set of the data 112 and the name 817. The links 901-1, 901-2, 901-3, 901-4, 901-5, 901-6, 901-7, 901-8, 901-9 are interchangeably referred to hereafter, collectively, as the links 901 and, generically, as a link 901.

Each link 901 may identify a respective video segment using a URL to a respective video segment. For example, the link 901-1 may comprise a link and/or a URL to the nonpersonalized video segment 111-1, as retrieved from the memory 103 or as stored in the memory 103, the link 901-2 may comprise a link and/or a URL to a personalized video segment that is being rendered by the video processing device 105-1 from the data 112-1 and the name 817, etc. In some embodiments, the link 901-1 may be encrypted and/or signed with a cryptographic key (e.g. previously provided to the communication device 107-1, for example when the request 801 is received), and the like; in other words, encryption and/or signing schemes may be used when exchanging data between the computing device 101 and the communication devices 107. Alternatively, the link 901-2 may not be generated until the personalized video segment that is being rendered by the video processing device 105-1 from the data 112-1 and the name 817 is complete. Similarly, links 901 to other personalized video segments to be rendered by the video processing device 105-1 from the data 112 and the name 817 may not be generated until respective rendering is complete.

However, the links 901 to all the video segments to be provided to the communication device 107-1 may be generated when the request 801 is received and/or before rendering of the personalized video segments begins; indeed, generation of the links 901 may include pre-processing of the data 112 and/or the personal data 116 to determine personalized video segments (yet to be generated) that share content, such pre-processing used to reduce redundant generation of at least portions of the personalized video segments. Furthermore, when the links 901 are generated, before rendering of the personalized video segments begin, a memory location is allocated for storing each of the personalized video segment associated with the links 901 (e.g. a memory location at the computing device 101, the memory 103, the database 115 and/or another memory).

As depicted, the computing device 101 has associated links 901, that identify personalized video segments to be rendered, with respective data 112, though such an association may be used as a placeholder until the respective personalized video segments are rendered, and/or such an association may not occur, and some other placeholder may be used.

As depicted, the computing device 101 generates (e.g. at the block 306 of the method 300) a manifest 903 identifying at least a first video segment selected according to the given order and, in particular, the link 901-1 which identifies the first nonpersonalized video segment 111-1. The manifest 903 does not include the link 901-2 as rendering of the respective personalized video segment is not yet complete. Indeed, the computing device 101 omits links 901 to other video segments that follow the link 901-2 to ensure that the respective video segments are not requested out of the given order.

Also depicted in FIG. 9, the computing device 101 transmits (e.g. at the block 306 of the method 300) the manifest 903, including the link 901-1, to the communication device 107-1 from which the request 801 was received.

Hence, FIG. 8 and FIG. 9 depict example embodiments of the block 306 where a first available video segment, according to the given order, is a first nonpersonalized video segment, and the controller 220 of the device 200 and/or the computing device 101 is further configured to: in response to receiving a request, transmit a manifest identifying the first nonpersonalized video segment.

However, in embodiments where a first available video segment, according to the given order, is a personalized video segment, and the controller 220 of the device 200 and/or the computing device 101 may be further configured to: in response to receiving a request, transmit a manifest identifying the first personalized video segment before rendering of the first personalized video segment is complete; and, when a request for the first personalized video segment is received prior to the rendering of the first personalized video segment being complete, return a message that prompts the communication device 107-1 to again request the first personalized video segment.

Figure 10:
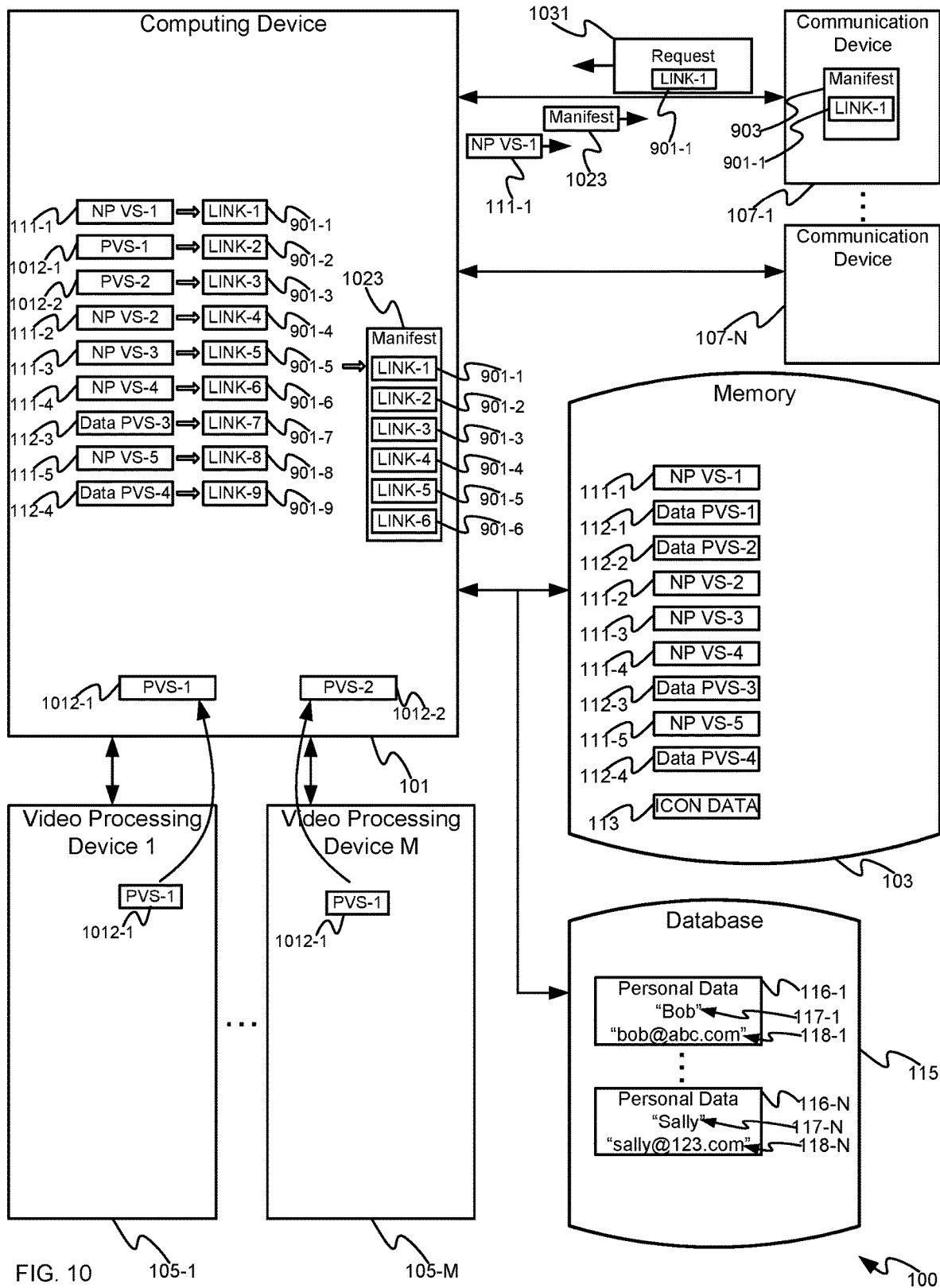
FIG. 10 depicts updating an example manifest and providing a first prerendered video segment of a personalized video, in accordance with some embodiments.

Attention is next directed to FIG. 10 which depicts example embodiments of the block 308, the block 310, the block 312 and the block 314 of the method 300.

As depicted, each video processing device 105-1, 105-M has completed rendering of a respective personalized video segment 1012-1, 1012-2 (e.g. the personalized video segment 1012-1 was rendered from the data 112-1 and the name 817, and the personalized video segment 1012-2 was rendered from the data 112-2 and the name 817). The respective personalized video segments 1012-1, 1012-2 are generally rendered as described with respect to FIG. 4, FIG. 5 and FIG. 6. As also depicted in FIG. 10, each video processing device 105-1, 105-M is providing the personalized video segments 1012-1, 1012-2 (interchangeably referred to hereafter, collectively, as the personalized video segments 1012 and, generically, as a personalized video segment 1012) to the computing device 101.

In response the computing device 101 determines (e.g. a "YES" decision at the block 308) that rendering of a personalized video segment 1012 is complete generates (e.g. at the block 310) an updated manifest 1023 (e.g. the manifest 903 is updated to the manifest 1023) to include the links 901-2, 901-3, 901-4, 901-5, 901-6. For example the links 901-2, 901-3 identify the respective personalized video segments 1012-1, 1012-2 and/or the computing device 101 associates the links 901-2, 901-3 with the personalized video segments 1012-1, 1012-2; indeed, in the depicted example, the data 112-1, 112-2 is replaced with the personalized video segments 1012-1, 1012-2 in the association with the links 901-2, 901-3 (though such a replacement is illustrative and the initial association with the data 112-1, 112-2 with the links 901-2, 901-3 may not have occurred and/or may have been used as placeholder and/or another type of placeholder may have been used).

However, the manifest 1023 further includes the links 901-4, 901-5, 901-6 that identify nonpersonalized video segments 111-2, 111-3, 111-4 that occur between the personalized video segment 1012-2 and another personalized video segment that is still being rendered and/or that is still to be rendered (e.g. a personalized video segment rendered from the data 112-3). In other words, the updated manifest 1023 includes all available video segments. Put another way, as rendering of a next personalized video segment is completed, the computing device 101 updates a manifest to identify the next personalized video segment and any nonpersonalized video segments that occur between the next personalized video segment and another personalized video segment that is still being rendered (and/or that is still to be rendered).

As also depicted in FIG. 10, the computing device 101 is transmitting (e.g. at the block 310) the updated manifest 1023 to the communication device 107-1.

Furthermore, in FIG. 10, the communication device 107-1, having received the link 901-1 with the manifest 903 is transmitting a request 1031 for the first nonpersonalized video segment 111-1 by including the link 901-1 in the request 1031. The request 1031 may be generated using a streaming video application at the communication device 107-1, which may be provided in the same browser application used to provide the webform 810; such streaming video application generally use manifests, such as the manifest 903, to manage and request segments of a streaming video in a given order using links in the manifest.

Hence, the computing device 101 receives the request 1031 (e.g. at the block 312 of the method 300) and, in response, provides (e.g. at the block 314 of the method 300), the nonpersonalized video segment 111-1 to the communication device 107-1. For example, the computing device 101 may stream the nonpersonalized video segment 111-1 to the communication device 107-1, as previously retrieved from the memory 103 and/or from the memory 103 and/or by retrieving the nonpersonalized video segment 111-1 from the memory 103 when not previously retrieved. As the nonpersonalized video segment 111-1 is received at the communication device 107-1, the communication device 107-1 "plays" the nonpersonalized video segment 111-1, for example using a streaming video application.

While in FIG. 10 the updated manifest 1023 is depicted as being transmitted prior to the nonpersonalized video segment 111-1, the manifest 1023 and the nonpersonalized video segment 111-1 may be transmitted in any order; for example, when the request 1031 is received at the computing device 101 prior to the personalized video segment 1012-1, 1012-2 being complete, the nonpersonalized video segment 111-1 may be transmitted prior to the updated manifest 1023.

In general, the computing device 101 continues to update the manifest used to provide video segments to the communication device 107-1 as rendering of the personalized video segments is completed. For example, attention is next directed to FIG. 11 which depicts the computing device 101 continuing to cause rendering of personalized video segments using the data 112-3, 112-4 provided to the video computing devices 105, with the name 817, to render respective personalized video segments.

Figure 11:
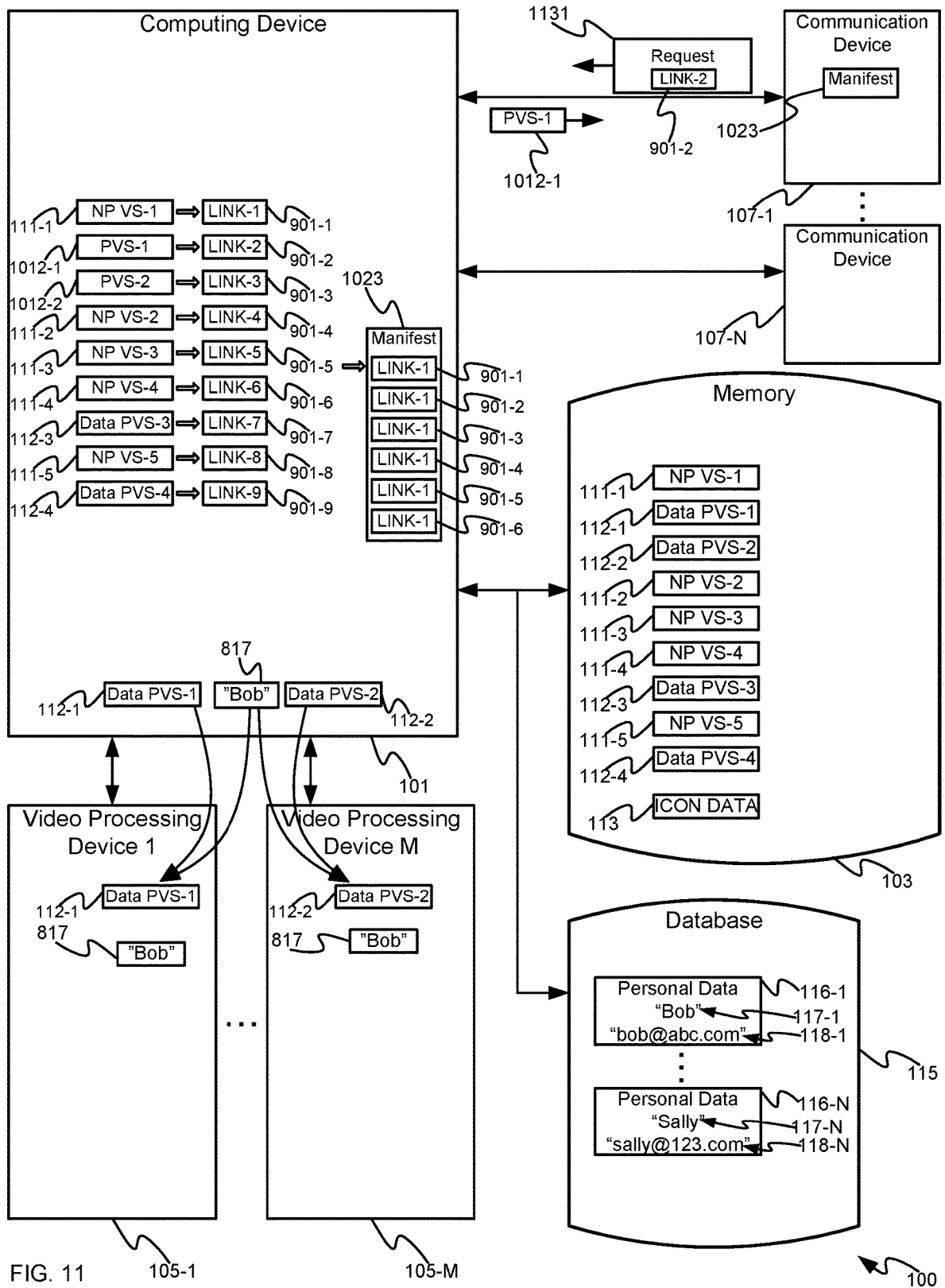
FIG. 11 depicts providing a first personalized video segment of a personalized video, in accordance with some embodiments.

Also depicted in FIG. 11, the communication device 107-1 continues to request video segments using the updated manifest 1023 via a request 1131 that includes the link 901-2 to the next video segment in the given order, and the computing device 101 continues to provide the respective next video segment to the communication device 107-1, specifically the personalized video segment 1012-1. In other words, as depicted, the computing device 101 continues to render personalized video segments that occur later in the personalized video, according to the given order, while providing, to the communication device 107-N, the personalized video segments that occur earlier in the personalized video, as they are completed.

Figure 12:
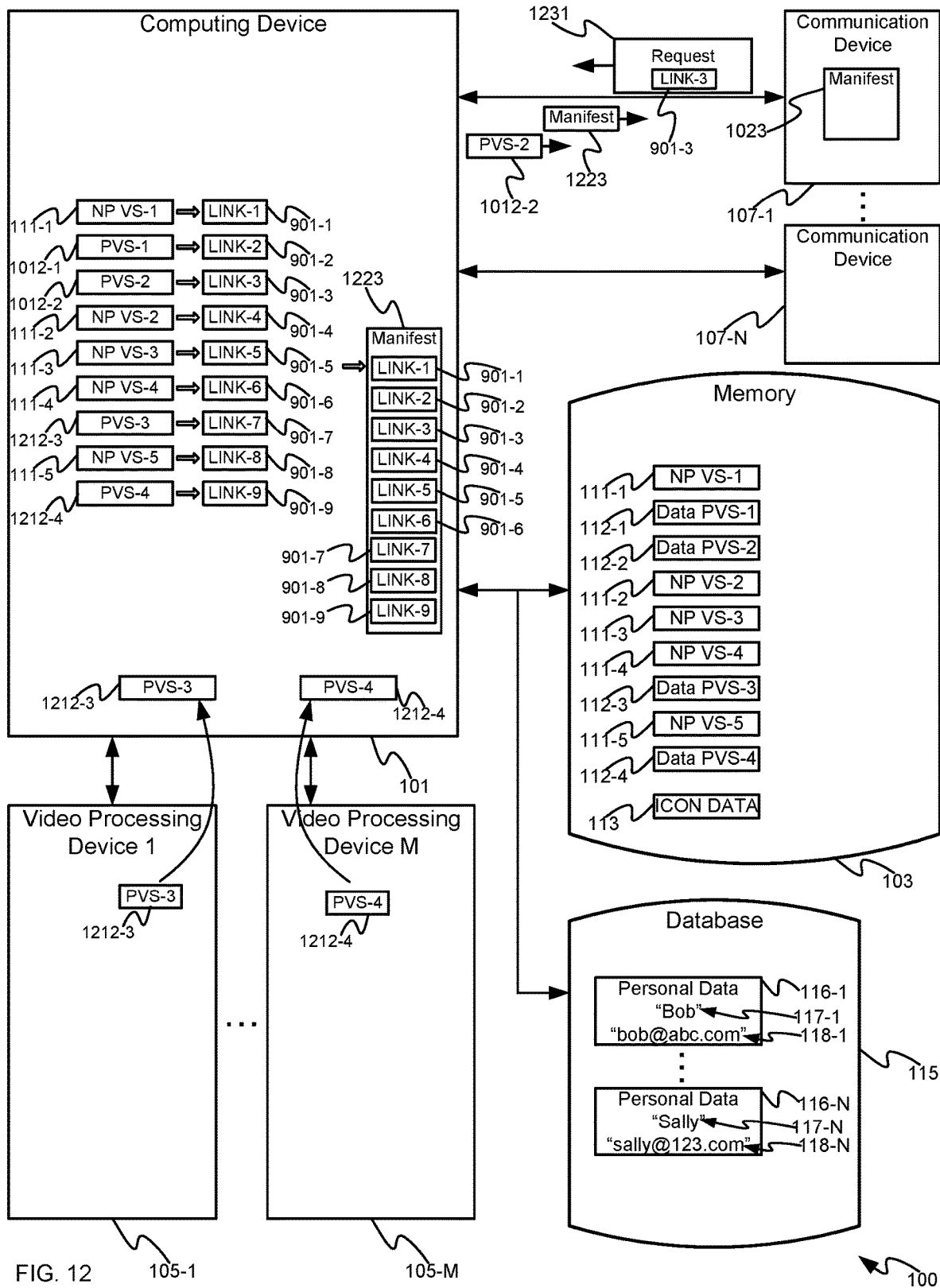
FIG. 12 depicts again updating an example manifest and completing rendering of a personalized video, in accordance with some embodiments.

Similarly, as depicted in FIG. 12, when personalized video segments 1212-3, 1212-4, rendered respectively from the data 112-3, 112-3, are completed by the video processing devices 105, an updated manifest 1223 is produced to include the respective links 901-7, 901-9 to the personalized video segments 1212-3, 1212-4, in the given order, as well as the link 901-8 to the nonpersonalized video segment 111-5 there between. The updated manifest 1223 is transmitted to the communication device 107-1, which continues to request the video segments of the personalized video segment according to the updated manifest 1023 (and/or the updated manifest 1223) via a request 1231 which, as depicted, includes the link 901-3 to the personalized video segment 1012-2.

When rendering of all the personalized video segments 1012-1, 1012-3, 1212-3, 1212-4 have been completed, the block 308 and the block 310 of the method 300 are no longer implemented, though the computing device 101 continues to implement the block 312 and the block 314 until all the video segments of the personalized video are provided to the communication device 107-1 (e.g. a "YES" decision at the block 316 such that the method 300 ends at the block 318).

While not depicted, it is further understood by a person of skill in the art that the computing device 101 and/or the video processing devices 105 may further convert any video segments (including the nonpersonalized video segments 111) to a file type, a frame rate and/or a resolution received in the request. When such conversions are to occur, the computing device 101 may control the video processing devices 105 in a manner that causes the first video segment to be converted before other video segments.

In addition, while present embodiments are described with respect to the personalized video segments being rendered, in parallel, two at a time, all the personalized video segments may be rendered concurrently and/or in parallel when the video processing devices 105 are available to do so.

Figure 13:
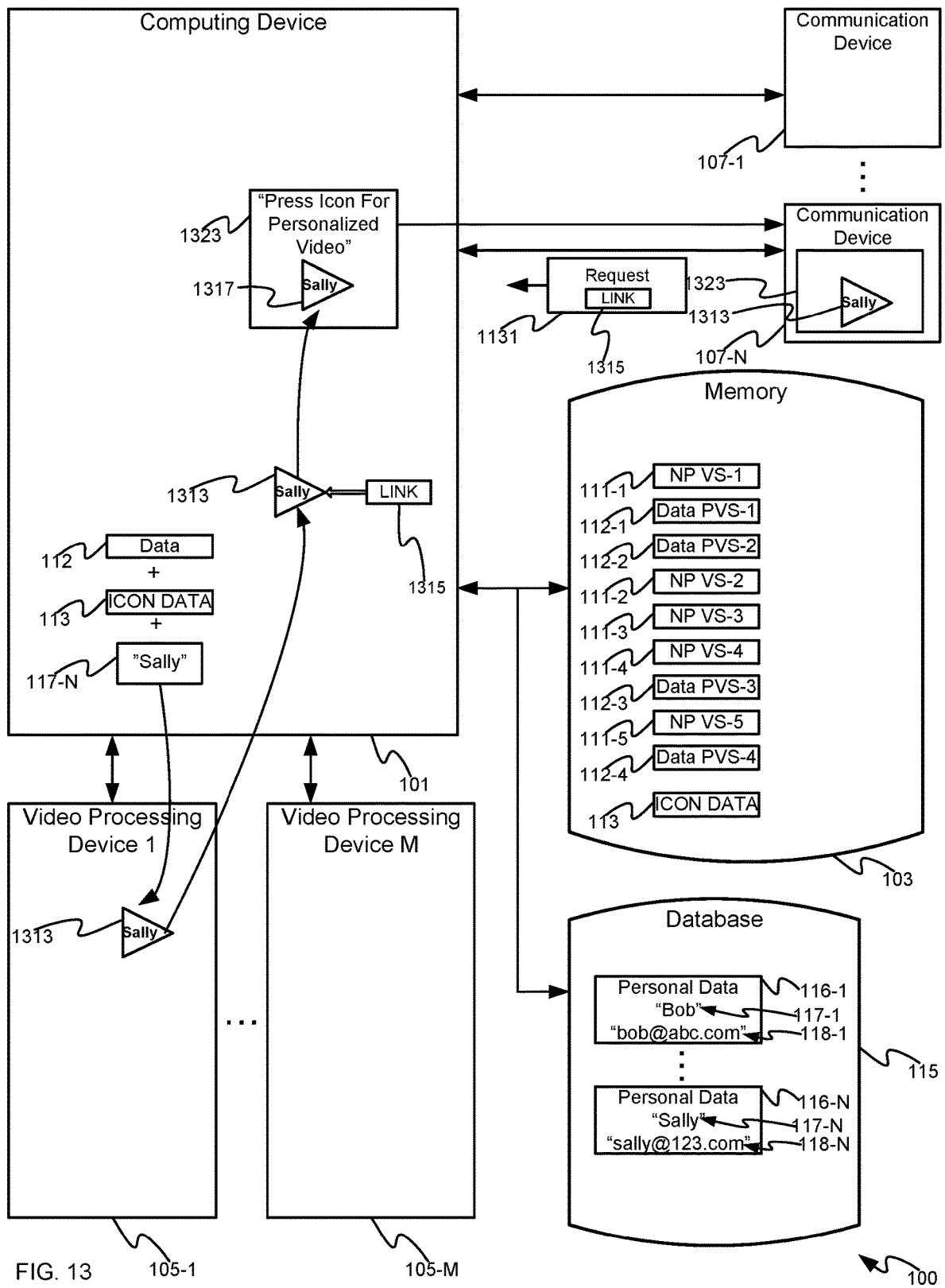
FIG. 13 depicts an example of initiating rendering of a personalized video via a message, in accordance with some embodiments.

Attention is next directed to FIG. 13 which depicts the system 100 after the personalized video described with respect to FIG. 8, FIG. 9, FIG. 10, FIG. 11 and FIG. 12 has been provided to the communication device 107-1. In particular a copy of the personalized video is not stored in the system 100; rather, the nonpersonalized video segments 111 and the data 112 remain stored at the memory 103 such that further personalized videos may be rendered for other communication devices 107-N.

FIG. 13 further depicts another example embodiment of a communication device 107 requesting a personalized video.

For example, also depicted in FIG. 13, the computing device 101 is causing a personalized icon 1313 to be generated using the personal data 116-N, as described with reference to FIG. 7, by providing to the video processing device 105-1, the name 117-N (e.g. "Sally"), the icon data 113, and optionally (as depicted) one or more of the sets of data 112 for example such that a nonpersonalized layer may be used to generate the personalized icon 1313. As depicted, however, the video processing device 105-1 generates the personalized icon 1313 comprising a "Play" symbol (e.g. from the icon data 113) with the name 117-N "Sally" incorporated therein.

The personalized icon 1313 is provided to the computing device 101 which may associate a link 1315 and/or another identifier (such as a UUID and the like) with the personalized icon 1313, the link 1315, and the like, for requesting a personalized video using the personal data 116-N, the nonpersonalized video segments 111 and the data 112. The link 1315, and the like, may include the name 117-N, the email address 118-N, and/or an identifier of the personal data 116-N (such as a UUID and the like), such that when the link 1315 is used to request a personalized video, the computing device 101 may receive the name 117-N, the email address 118-N, and/or the identifier reference of the personal data 116-N to render a personalized video. Indeed, the personalized icon 1313 may be associated with one or more first UUIDs identifying the personalized data 116-N, and one or more second UUIDs identifying the segments 111 and the data 112.

The computing device 101 may incorporate the personalized icon 1313 and the associated link 1315, and like, as a virtual button 1317, and the like into a message 1323, such as an email, and the like, and transmits the message 1323 to the communication device 107-N using, for example, the email address 118-N stored in the personal data 116-N that includes the name 117-N used to generate the personalized icon 1313. As depicted, the message 1323 includes optional text "Press Icon For Personalized Video", to prompt a user of the communication device 107-N to actuate the virtual button 1317.

As depicted, the communication device 107-N receives the message 1323 and renders the message 1323 at a display device thereof, for example in a messaging application, including the virtual button 1317. It is understood by a person of skill in the art that when the virtual button 1317 is actuated (e.g. using an input device of the communication device 107-N), the communication device 107-N transmits a request 1131, that includes the link 1315, to the computing device 101. Receipt of the request 1131 at the computing device 101 causes the computing device 101 to initiate the method 300, as described above with respect to FIG. 8, FIG. 9, FIG. 10, FIG. 11 and FIG. 12, but with the personalized video rendered using the name 117-N "Sally" rather than the name 817 "Bob". A person of skill in the art further understands that the communication device 107-N launches a video streamlining application when the request 1131 is transmitted and/or when a manifest is received and/or when a first video segment identified in the manifest is received.

Furthermore, the name 117-N "Sally" used to render the personalized video may be retrieved from the memory 103 and/or may be received with the request 1131. Indeed, in embodiments described herein, personal data associated with a request, to be used to render a personalized video, may be received with the request and/or the personal data associated with a request may be retrieved from a database (e.g. the memory 103) using information received with the request (such as a reference to a database record, such as the personal data 116-N, an email address, and the like).

In this manner, a personalized video may be rendered for each of the communication devices 107 and/or users thereof "on demand", without prerendering and storing a personalized video for each, thereby using processing resources to render such personalized videos "on demand". Furthermore, memory resources in the system 100 are used to store the prerendered nonpersonalized video segments 111 and the data 112, and not personalized videos for each of the communication devices 107 and/or users rendered thereof in advance of the personalized videos being requested.

In addition, embodiments described herein depict personalized videos being requested in association with webforms and/or in response to receiving a message that includes a virtual button, and the like, for requesting a personalized video, such messages generated, for example, from a database of clients and the like. Hence, campaigns to reach existing clients using personalized videos may be initiated by transmitting messages to each of the clients, and a personalized video is rendered only for those clients who respond to the message, thereby saving processing resources and/or memory resources as compared to prerendering and storing personalized videos for all the clients stored in the database.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some implementations, the terms are understood to be "within 10%," in other implementations, "within 5%", in yet further implementations, "within 1%", and in yet further implementations "within 0.5%".

Those skilled in the art will appreciate that in some implementations, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other implementations, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
    a communication interface; and
    a controller having access to a memory storing: nonpersonalized video segments; and data for rendering personalized video segments including video fields for population by personal data indicative of one or more of text and graphics for incorporation into the personalized video segments; the nonpersonalized video segments and the personalized video segments associated with a given order,
    the controller configured to:
        render, according to the given order, the personalized video segments using the data, with the video fields populated with the personal data associated with a request from a communication device such that a rendered personalized video segment comprises at least one video frame that includes the personal data at a location of a respective video field;
        as rendering of the personalized video segments is completed, update, at the communication device, using the communication interface, a manifest identifying the nonpersonalized video segments and the personalized video segments, as rendered, according to the given order; and
        provide to the communication device, using the communication interface, video segments identified in the manifest.

2. The device of claim 1, wherein the device is further configured to render the personalized video segments by:
    retrieving, from the data for rendering the personalized video segments, one or more of a respective prerendered static layer and a respective prerendered non-static layer;
    rendering a respective personalized layer using the personal data; and
    combining the respective personalized layer with one or more of the respective prerendered static layer and the respective prerendered non-static layer.

3. A system comprising:
    one or more memories storing: nonpersonalized video segments; and data for rendering personalized video segments including video fields for population by personal data indicative of one or more of text and graphics for incorporation into the personalized video segments; the nonpersonalized video segments and the personalized video segments associated with a given order;
    a computing device configured to determine the personal data based on a request received from a communication device; and
    one or more video processing devices configured to:
        render, according to the given order, the personalized video segments using the data, with the video fields populated with the personal data associated with a request from a communication device,
    the computing device further configured to: as rendering of the personalized video segments is completed, update, at the communication device, a manifest identifying the nonpersonalized video segments and the personalized video segments, as rendered, according to the given order; and provide, to the communication device, video segments identified in the manifest.

4. The system of claim 3, wherein the one or more video processing devices are further configured to render the personalized video segments by:
    retrieving, from the data for rendering the personalized video segments, one or more of a respective prerendered static layer and a respective prerendered non-static layer;
    rendering a respective personalized layer using the personal data; and combining the respective personalized layer with one or more of the respective prerendered static layer and the respective prerendered non-static layer.

5. The system of claim 4, wherein the one or more video processing devices are further configured to render the personalized video segments by:
retrieving, from the data for rendering personalized video segments, transformation data; and
rendering the respective personalized layer using the personal data, and according to the transformation data, such that the respective personalized layer is transformed according to one or more of a previous respective personalized layer and a next respective personalized layer.

6. The system of claim 3, wherein a first video segment, according to the given order, is a first nonpersonalized video segment, and computing device is further configured to:
in response to receiving the request, update the manifest identifying the first nonpersonalized video segment.

7. The system of claim 3, wherein the one or more video processing devices are further configured to:
render the at least a subset of the personalized video segments in parallel.

8. The system of claim 3, wherein the one or more video processing devices and the computing device are further configured to:
continue to render the personalized video segments that occur later in the personalized video, according to the given order, while providing, to the communication device, the personalized video segments that occur earlier in the personalized video, as rendering thereof is completed.

9. The system of claim 3, wherein the computing device is further configured to:
as rendering of a next personalized video segment is completed, update the manifest to identify the next personalized video segment and any nonpersonalized video segments that occur between the next personalized video segment and another personalized video segment that is still being rendered.

10. The system of claim 3, wherein the personal data associated with the request is received with the request.

11. The system of claim 3, wherein the personal data associated with the request is retrieved from a database using information received with the request.

12. A method comprising:
accessing, at one or more devices, a memory storing: nonpersonalized video segments; and data for rendering personalized video segments including video fields for population by personal data indicative of one or more of text and graphics for incorporation into the personalized video segments; the nonpersonalized video segments and the personalized video segments associated with a given order;
rendering, at the one or more devices, according to the given order, the personalized video segments using the data, with the video fields populated with the personal data associated with a request from a communication device such that a rendered personalized video segment comprises at least one video frame that includes the personal data at a location of a respective video field;

as rendering of the personalized video segments is completed, updating, via the one or more devices, at the communication device, a manifest identifying the nonpersonalized video segments and the personalized video segments, as rendered, according to the given order; and
providing, via the one or more devices, to the communication device, video segments identified in the manifest.

13. The method of claim 12, further comprising rendering the personalized video segments by:
retrieving, from the data for rendering personalized video segments, one or more of a respective prerendered static layer and a respective prerendered non-static layer;
rendering a respective personalized layer using the personal data; and
combining the respective personalized layer with one or more of the respective prerendered static layer and the respective prerendered non-static layer.

14. The method of claim 13, further comprising rendering the personalized video segments by:
retrieving, from the data for rendering personalized video segments, transformation data; and
rendering the respective personalized layer using the personal data, and according to the transformation data, such that the respective personalized layer is transformed according to one or more of a previous respective personalized layer and a next respective personalized layer.

15. The method of claim 12, wherein a first available video segment, according to the given order, is a first nonpersonalized video segment, and the method further comprises:
in response to receiving the request, transmitting the manifest identifying the first nonpersonalized video segment.

16. The method of claim 12, further comprising:
rendering of the at least a subset of the personalized video segments in parallel.

17. The method of claim 12, further comprising:
continuing to render the personalized video segments that occur later in the personalized video, according to the given order, while providing, to the communication device, the personalized video segments that occur earlier in the personalized video, as they are completed.

18. The method of claim 12, further comprising:
as rendering of a next personalized video segment is completed, updating the manifest to identify the next personalized video segment and any nonpersonalized video segments that occur between the next personalized video segment and another personalized video segment that is still being rendered.

19. The method of claim 12, wherein the personal data associated with the request is received with the request.

20. The method of claim 12, wherein the personal data associated with the request is retrieved from a database using information received with the request.

* * * * *